US010668847B2

(12) United States Patent
Takenaka et al.

(10) Patent No.: US 10,668,847 B2
(45) Date of Patent: Jun. 2, 2020

(54) ASSIST GRIP HANDLE

(71) Applicant: HONDA ACCESS CORP., Niiza-shi, Saitama (JP)

(72) Inventors: Shinpei Takenaka, Niiza (JP); Akihiko Saito, Niiza (JP)

(73) Assignee: HONDA ACCESS CORP., Niiza-shi (JP)

( * ) Notice: Subject to any disclaimer, the term of this patent is extended or adjusted under 35 U.S.C. 154(b) by 160 days.

(21) Appl. No.: 16/067,252

(22) PCT Filed: Feb. 28, 2017

(86) PCT No.: PCT/JP2017/007913
§ 371 (c)(1),
(2) Date: Jun. 29, 2018

(87) PCT Pub. No.: WO2017/159354
PCT Pub. Date: Sep. 21, 2017

(65) Prior Publication Data
US 2019/0023166 A1 Jan. 24, 2019

(30) Foreign Application Priority Data

Mar. 17, 2016 (JP) ................................. 2016-054477

(51) Int. Cl.
*B60J 9/00* (2006.01)
*B60N 3/02* (2006.01)
(Continued)

(52) U.S. Cl.
CPC .............. *B60N 3/026* (2013.01); *A62B 3/005* (2013.01); *B25D 1/00* (2013.01); *B60N 3/02* (2013.01);
(Continued)

(58) Field of Classification Search
CPC ...... B25D 11/068; B25D 17/043; B25D 1/00; B25D 2250/271; B25D 2250/295;
(Continued)

(56) References Cited

U.S. PATENT DOCUMENTS 6,666,566 B1 * 12/2003 Uke .................... F21V 33/0064
362/109
7,051,391 B2 * 5/2006 Wang ....................... B25F 1/00
7/144

(Continued)

FOREIGN PATENT DOCUMENTS

JP 57-174147 U 11/1982
JP 10-314327 A 12/1998
(Continued)

OTHER PUBLICATIONS

International Search Report dated May 23, 2017, issued in counterpart International Application No. PCT/JP2017/007913 (2 pages).

*Primary Examiner* — Kiran B Patel
(74) *Attorney, Agent, or Firm* — Westerman, Hattori, Daniels & Adrian, LLP

(57) ABSTRACT

Provided is an assist grip handle storing an escape hammer. The handle is to be attached to an interior space of a vehicle, and includes a bar-shaped grip portion; a curved portion continuous with at least one end of the grip portion; and an attachment portion continuous with the curved portion and attached to an interior member of the vehicle. Since provided inside the grip portion is a storage portion continuous with an opening section formed at the curved portion side, and an escape hammer is stored in the storage portion, the hammer can be stored in the handle in a compact manner. Since there are provided a biasing member biasing the hammer toward the opening section side; a regulation portion for regulating the hammer; and a push button for
(Continued)

releasing the restriction by the regulation portion, the hammer can be easily installed in and removed from the handle.

8 Claims, 17 Drawing Sheets

(51) Int. Cl.
   *A62B 3/00* (2006.01)
   *B25D 1/00* (2006.01)
(52) U.S. Cl.
   CPC ........ *B60N 3/023* (2013.01); *B25D 2250/271* (2013.01); *B25D 2250/295* (2013.01)
(58) Field of Classification Search
   CPC ... B25F 5/02; F41A 19/10; F41A 3/66; B25G 1/01; A62B 3/005
   See application file for complete search history.

(56) References Cited

U.S. PATENT DOCUMENTS

| | | | |
|---|---|---|---|
| 9,995,065 B2* | 6/2018 | Witte | E05B 81/64 |
| 10,351,101 B2* | 7/2019 | Neuhoff | E05B 85/16 |
| 10,384,583 B2* | 8/2019 | Adachi | B60N 3/026 |
| 2001/0017247 A1* | 8/2001 | Machida | B60N 3/023 |
| | | | 188/290 |
| 2002/0021014 A1* | 2/2002 | Sakuma | B60N 3/023 |
| | | | 296/1.02 |
| 2002/0024226 A1* | 2/2002 | Totani | B29C 45/1704 |
| | | | 294/137 |
| 2002/0056173 A1* | 5/2002 | Koops | E05B 17/0016 |
| | | | 16/412 |
| 2002/0070484 A1* | 6/2002 | Davis, Jr. | B29C 45/0017 |
| | | | 264/572 |
| 2002/0113465 A1* | 8/2002 | Inari | B60N 3/023 |
| | | | 296/214 |
| 2002/0116791 A1* | 8/2002 | Grady | B60N 3/02 |
| | | | 16/444 |
| 2003/0126718 A1* | 7/2003 | Yamamoto | B60N 3/023 |
| | | | 16/110.1 |
| 2004/0002405 A1* | 1/2004 | Laukkanen | B60W 30/18 |
| | | | 477/209 |
| 2004/0032157 A1* | 2/2004 | Trimborn | A63G 7/00 |
| | | | 297/484 |
| 2004/0051346 A1* | 3/2004 | Ozios | B60J 1/02 |
| | | | 296/214 |
| 2004/0076014 A1* | 4/2004 | Bach | B60N 3/026 |
| | | | 362/501 |
| 2005/0028323 A1* | 2/2005 | Meyer | B60N 3/023 |
| | | | 16/445 |
| 2005/0275226 A1* | 12/2005 | Watanabe | E05B 85/16 |
| | | | 292/216 |
| 2006/0032024 A1 | 2/2006 | Moon | |
| 2006/0064822 A1* | 3/2006 | Wang | A62B 3/005 |
| | | | 7/144 |
| 2006/0143868 A1* | 7/2006 | Bauer | B60N 3/023 |
| | | | 16/438 |
| 2006/0174584 A1* | 8/2006 | Nakazato | B60N 3/026 |
| | | | 52/834 |
| 2007/0046080 A1* | 3/2007 | Muneta | B60R 25/246 |
| | | | 297/184.13 |
| 2007/0132261 A1* | 6/2007 | Ehrlich | B60N 3/026 |
| | | | 296/1.02 |
| 2008/0018128 A1* | 1/2008 | Yamagiwa | B60N 3/026 |
| | | | 296/1.02 |
| 2008/0098563 A1* | 5/2008 | Lee | B60N 3/023 |
| | | | 16/110.1 |
| 2009/0079207 A1* | 3/2009 | Manzhura | E05B 13/001 |
| | | | 292/336.3 |
| 2009/0079233 A1* | 3/2009 | Hidaka | B60N 3/023 |
| | | | 296/210 |
| 2010/0175220 A1* | 7/2010 | Kajio | B60N 3/023 |
| | | | 16/110.1 |
| 2010/0244477 A1* | 9/2010 | Jagasia | B60N 3/026 |
| | | | 296/1.02 |
| 2012/0074278 A1* | 3/2012 | Hamaguchi | B60N 3/023 |
| | | | 248/221.11 |
| 2012/0080898 A1* | 4/2012 | Kajio | B60N 3/026 |
| | | | 296/1.02 |
| 2012/0273310 A1* | 11/2012 | Seto | B60N 3/023 |
| | | | 188/290 |
| 2012/0319421 A1* | 12/2012 | Ruzich | B60N 3/023 |
| | | | 296/1.02 |
| 2013/0134723 A1* | 5/2013 | Yokoyama | E05B 85/10 |
| | | | 292/336.3 |
| 2014/0015262 A1* | 1/2014 | Da Deppo | E05B 77/06 |
| | | | 292/336.3 |
| 2014/0093311 A1* | 4/2014 | Masuda | B60N 3/026 |
| | | | 403/326 |
| 2014/0119041 A1* | 5/2014 | Petrucelli | F21V 33/0084 |
| | | | 362/523 |
| 2014/0167433 A1* | 6/2014 | Gerber | E05B 79/06 |
| | | | 296/1.02 |
| 2015/0021933 A1* | 1/2015 | Shin | B60N 3/023 |
| | | | 292/336.3 |
| 2015/0033477 A1* | 2/2015 | Rubin | B25D 5/02 |
| | | | 7/158 |
| 2015/0059529 A1* | 3/2015 | Franken | B25G 3/24 |
| | | | 81/25 |
| 2015/0232011 A1* | 8/2015 | Kajio | B60N 3/02 |
| | | | 296/1.02 |
| 2015/0322699 A1* | 11/2015 | Ilardo | E05B 77/06 |
| | | | 292/336.3 |
| 2016/0032627 A1* | 2/2016 | Yoshino | E05B 85/16 |
| | | | 292/336.3 |
| 2017/0130493 A1* | 5/2017 | Guerin | E05B 85/107 |
| 2017/0138587 A1* | 5/2017 | Lu | F21V 31/005 |
| 2018/0087306 A1* | 3/2018 | Nishida | B60N 3/023 |
| 2019/0239431 A1* | 8/2019 | Kastelic, Jr. | B62D 1/00 |

FOREIGN PATENT DOCUMENTS

| | | |
|---|---|---|
| JP | 11-268568 A | 10/1999 |
| JP | 2002-104048 A | 4/2002 |
| JP | 2006-51920 A | 2/2006 |
| JP | 2007-181902 A | 7/2007 |

* cited by examiner

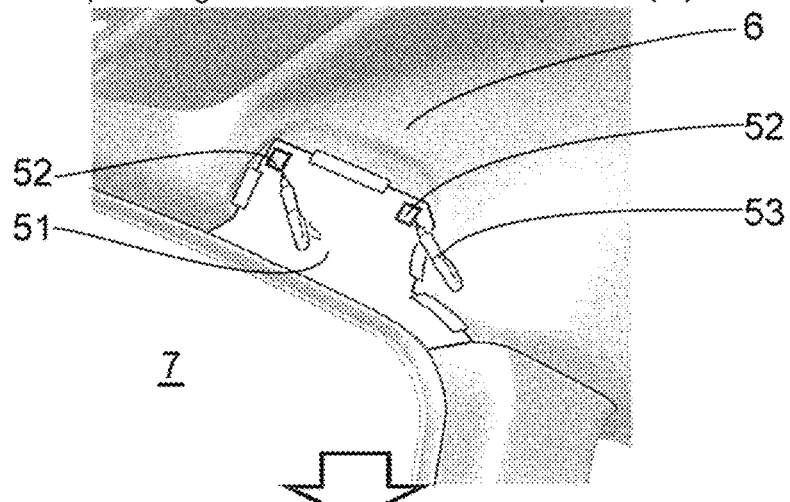
FIG.6A  1) Leaving marks on roof LNG via pattern paper
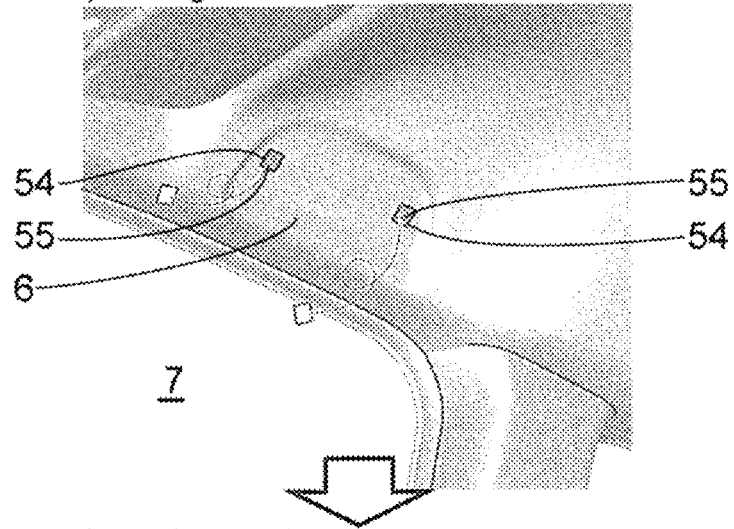
FIG.6B  2) Cutting roof LNG
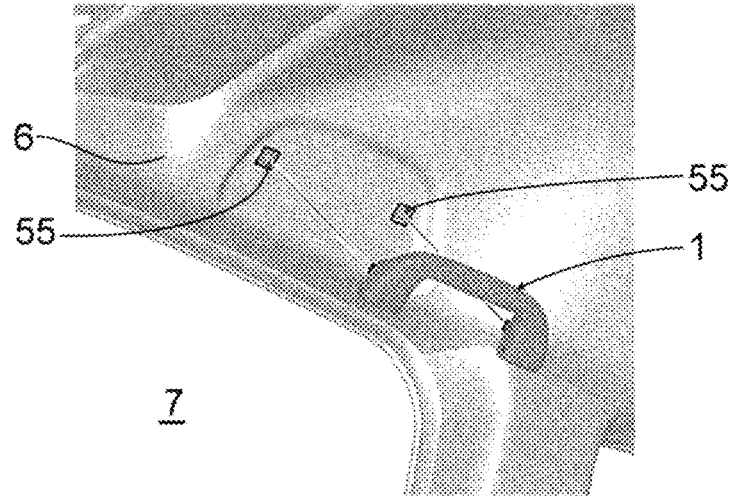
FIG.6C  3) Installing grab rail

ASSIST GRIP HANDLE

TECHNICAL FIELD

The present invention relates to an assist grip handle equipped with a hammer used to break a window glass.

BACKGROUND ART

Conventionally, as such a type of assist grip handle, there has been known a hammer-equipped assist grip handle (e.g. Patent document 1) including a grip portion having the shape of a band whose central region is curved in a concave manner; a hammer member(s) vertically provided at both ends of the grip portion, and capable of being used to break a window glass of a vehicle in which the assist grip handle is installed; a receiving member(s) that is to be embedded and fixed in an inner side of a roof side of the vehicle in which the assist grip handle is to be installed, has an insertion hole allowing the hammer member to be inserted therethrough, whereby the hammer member as well as the grip portion may then be removed from such insertion hole; and a switching unit for switching between a state prohibiting the disengagement of the hammer member from the insertion hole and a state allowing the disengagement of the hammer member from the insertion hole.

Further, although it is not an assist grip handle (grab rail), there has also been known an emergency escape tool (e.g. Patent document 2) utilizing a warning flare. This emergency escape tool has a crowning member to be attached to the end portion of a warning flare; and a hammer portion used to break a reinforced glass of a vehicle or the like is provided in a way such that it points toward a length direction of the warning flare.

However, with regard to the above emergency escape tool, if there are used multiple hammers, there will also be required multiple sections dedicated to storing the multiple hammers, which is unfavorable in the case of, for example, a vehicle with a limited inner space(s). Further, it is also inconvenient if the hammer is stored in a location other than the above dedicated storage section(s), such as the inner space of a dashboard, because the hammer may not be able to be immediately taken out in the event of an emergency.

In this regard, since the aforementioned hammer-equipped assist grip handle is normally used as an assist grip handle, there does not exist a problem that a dedicated storage section(s) is required as is the case of the above emergency escape tool.

PRIOR ART DOCUMENTS

Patent document 1: JP-A-2002-104048
Patent document 2: JP-A-2007-181902

SUMMARY OF THE INVENTION

Problem to be Solved by the Invention

However, the problems with the abovementioned hammer-equipped assist grip handle are that the assist grip handle has to be formed large as a whole due to the fact that this assist grip handle integrally includes the grip portion and the hammer member; that a special alteration has to be made in a vehicle so as to allow the assist grip handle to be attached thereto and removed therefrom; and that it is difficult to retrofit the assist grip handle.

Further, since the entire assist grip handle needs to be removed, the removal process thereof may be cumbersome as well.

Thus, in view of the abovementioned problems, it is an object of the present invention to provide an unconventional assist grip handle capable of storing an escape hammer.

Means to Solve the Problem

In order to achieve the aforementioned objectives, the invention of a first aspect is an assist grip handle that is to be attached to an interior space of a vehicle, and includes:
a grip portion extending in the shape of a bar;
a bent portion continuous with at least one end of the grip portion; and
an attachment portion that is continuous with the bent portion and is attached to an interior member of the vehicle, in which
a storage portion is provided inside the grip portion, the storage portion being continuous with an opening section formed at the bent portion side; and an escape hammer is stored in the storage portion.

As for the invention of a second aspect, the assist grip handle further includes:
a regulation portion for restricting a movement of the escape hammer; and
an operation portion for releasing the restriction by the regulation portion.

As for the invention of a third aspect, the escape hammer has a slanted surface portion formed on at least one end side of the escape hammer, and the slanted surface portion composes a part of the bent portion.

As for the invention of a fourth aspect, the bent portion is formed at both sides of the grip portion, the opening section is individually formed at the bent portions on both sides, a slanted surface portion is formed at both ends of the escape hammer, and the escape hammer is capable of being taken out from any one of the opening sections.

As for the invention of a fifth aspect, the operation portion is provided at the opening section side.

As for the invention of a sixth aspect, the operation portion is provided at the grip portion.

As for the invention of a seventh aspect, the operation portion is provided at the escape hammer.

As for the invention of an eighth aspect, a cutting member is provided inside the slanted surface portion of the escape hammer.

Effects of the Invention

According to the configuration as set forth in the first aspect, the escape hammer can be stored in the assist grip handle in a compact manner.

According to the configuration as set forth in the second aspect, the attachment and removal of the hammer is easy.

According to the configuration as set forth in the third aspect, since a part of the hammer composes a part of the assist grip handle, the hammer is allowed to have a large size.

According to the configuration as set forth in the fourth aspect, the escape hammer can be taken out from any one of the opening sections on both sides.

According to the configuration as set forth in the fifth aspect, the operation portion allows the hammer to be easily taken out while the assist grip handle is being gripped.

According to the configuration as set forth in the sixth aspect, the escape hammer can be taken out by operating the operation portion of the grip portion.

According to the configuration as set forth in the seventh aspect, the escape hammer can be taken out by operating the operation portion of the escape hammer.

According to the configuration as set forth in the eighth aspect, the cutting member can be held safely.

BRIEF DESCRIPTION OF THE DRAWINGS

FIG. 6A is a perspective view showing a process of leaving marks on an interior member by means of a pattern paper in the first embodiment.

FIG. 6B is a perspective view showing a process of boring holes in locations bearing the marks in the first embodiment.

FIG. 6C is a perspective view showing a process of attaching the assist grip handle to the interior member in the first embodiment.

MODE FOR CARRYING OUT THE INVENTION

Figure 1:
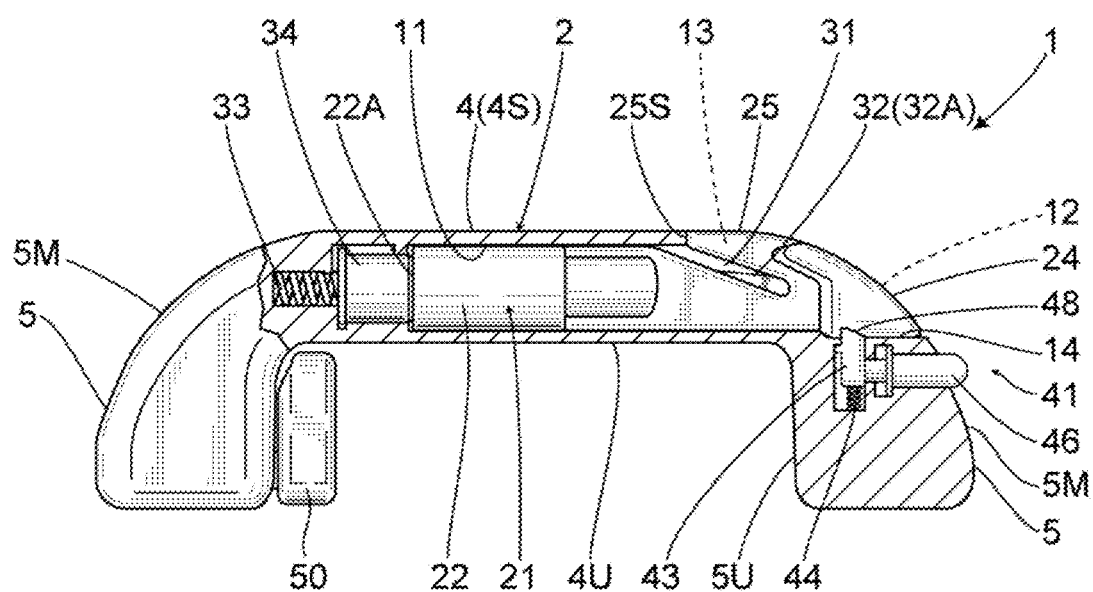
FIG. 1 is a cross-sectional view of a first embodiment of the present invention.
Figure 2:
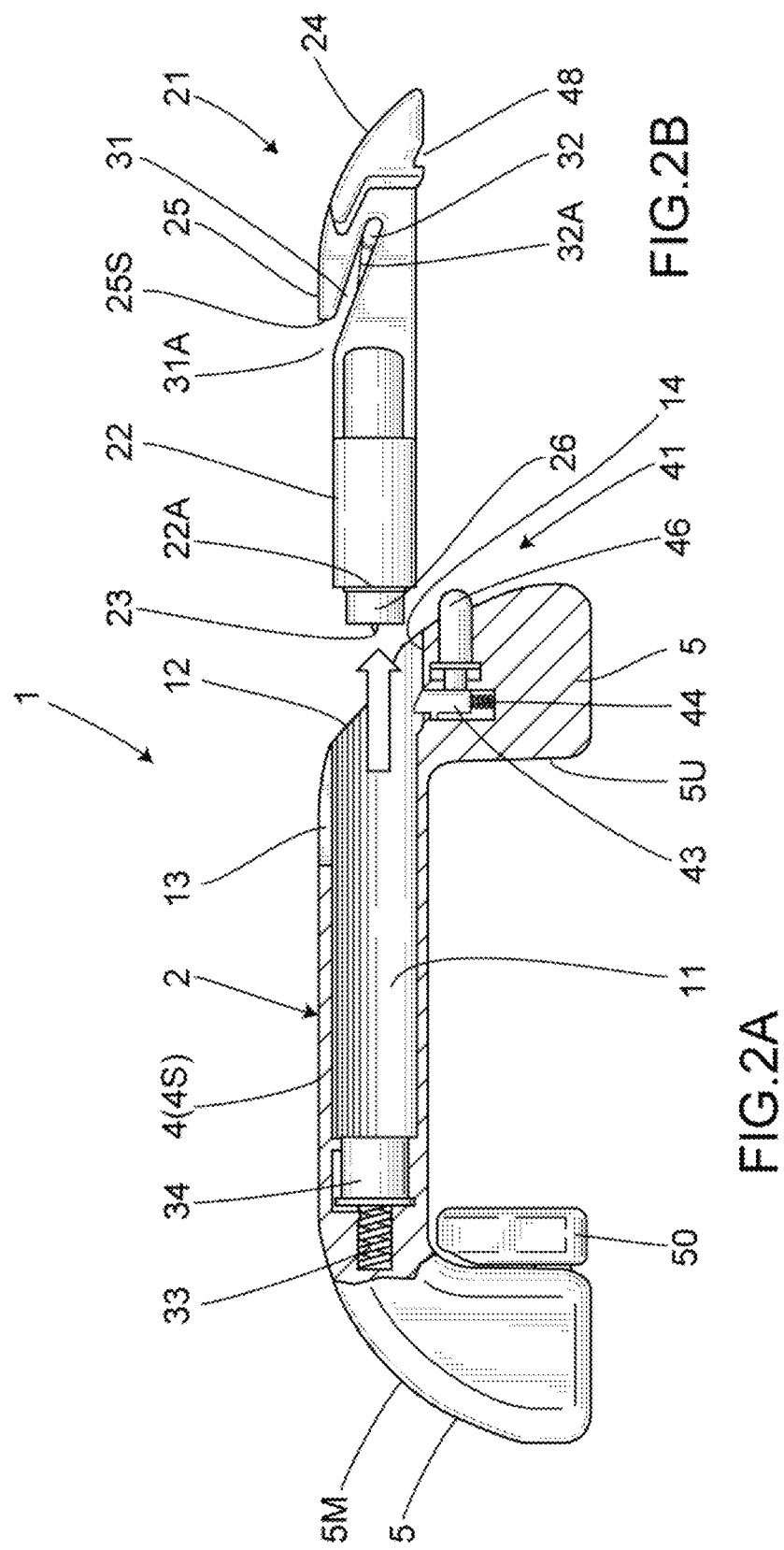
FIG. 2A is a cross-sectional view of a main body of an assist grip handle in the first embodiment.
FIG. 2B is a front view of the escape hammer in the first embodiment.
Figure 3:
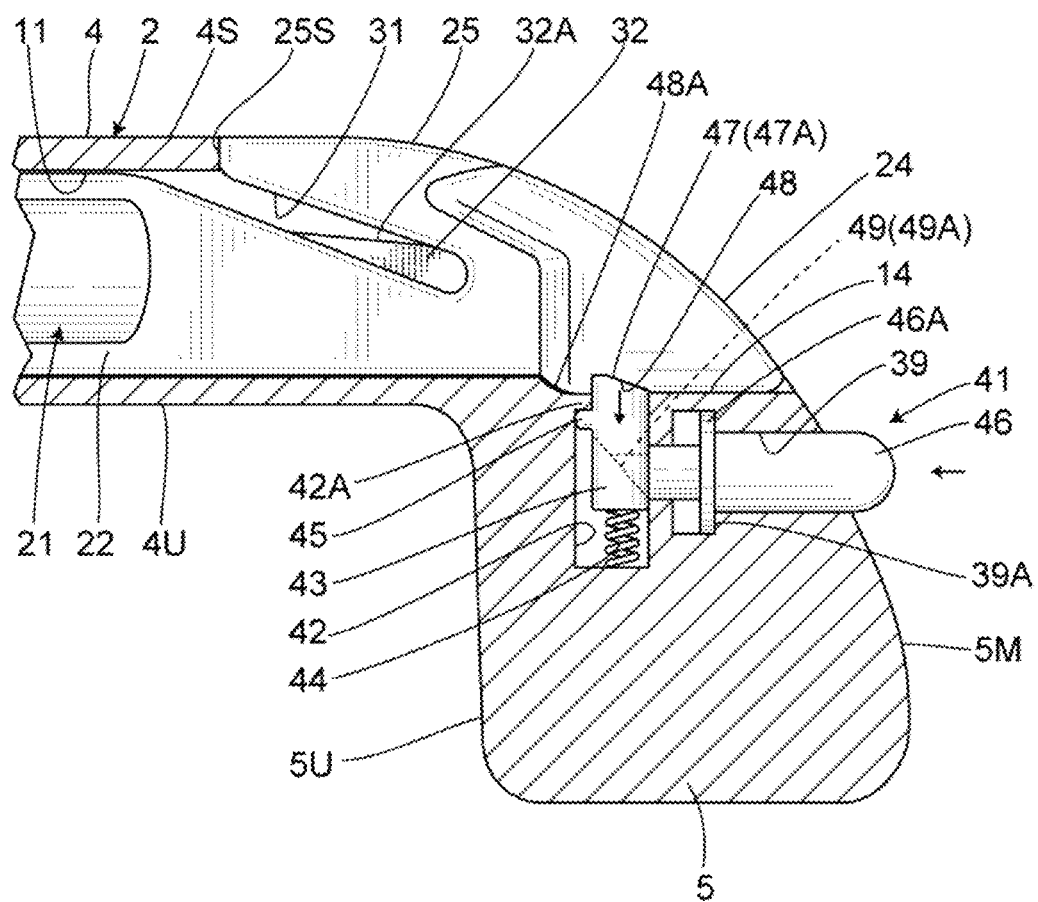
FIG. 3 is an enlarged cross-sectional view of main portions of the first embodiment.
Figure 4:
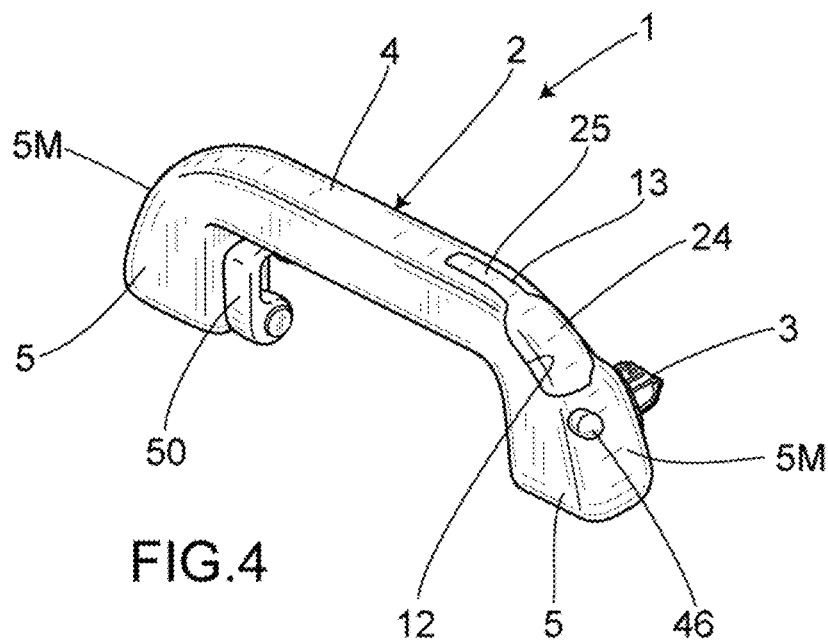
FIG. 4 is a perspective view of the first embodiment.
Figures 5A, 5B:
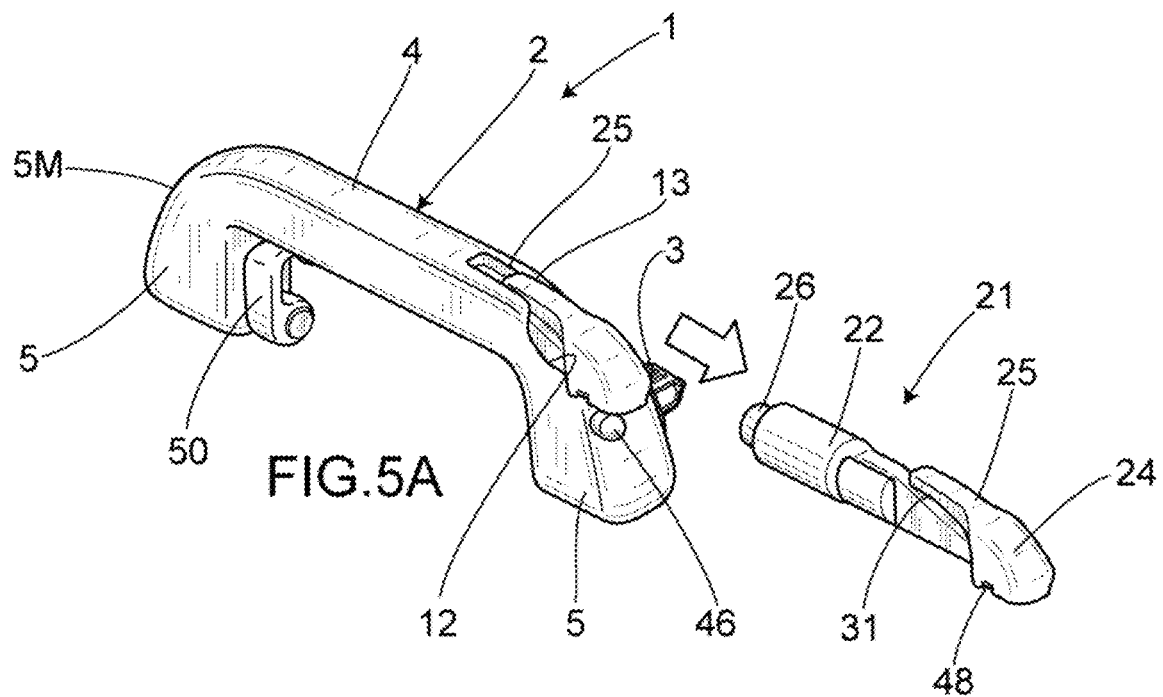
FIG. 5A is a perspective view of the assist grip handle in the first embodiment.
FIG. 5B is a perspective view of the escape hammer in the first embodiment.

Embodiments of the assist grip handle of the present invention are described hereunder with reference to drawings.

First Embodiment

FIGS. 1 through 6C show a first embodiment of the invention. As shown in these drawings, an assist grip handle 1 integrally includes a main body 2 and an attachment portion(s) 3. The main body 2 is made of a synthetic resin; and includes a grip portion 4 extending in the shape of a bar, and curved portions 5, 5 as bent portions integrally provided at the two ends of such grip portion 4 in a length direction. Further, the attachment portions 3, 3 are respectively provided at the curved portions 5, 5, and the attachment portion 3 is to be attached to an interior member 6 of a vehicle. Particularly, the attachment portion 3 is provided at a back surface side of the curved portion 5.

Further, a storage portion 11 is formed in the grip portion 4. This storage portion 11 is formed along the length direction of the grip portion 4, and has an opening section 12 that is open at one of the curved portions 5.

The interior member 6 may, for example, be an inner wall portion in the interior space of a vehicle; and the assist grip handle 1 may, for example, be provided above the side portion of a seat.

As for the main body 2, an outer edge 4S of the grip portion 4 is formed substantially straight, protruding curved surface portions 5M, 5M are formed on the outer edges of the curved portions 5, 5 on both sides, and these curved surface portions 5M, 5M are formed in a way such that they are continuous with the outer edge 4S of the grip portion 4.

Further, an inner edge 4U of the grip portion 4 is formed substantially straight, and an inner edge 5U of the curved portion 5 is formed in a way such that the inner edge 5U is substantially orthogonal to the inner edge 4U. Here, in FIG. 1, the upper side of the grip portion 4 is the outer edge 4S, and the lower side of the grip portion 4 is the inner edge 4U. The upper and lower sides of the assist grip handle 1 or the like are explained below with reference to the orientation of the assist grip handle 1 in FIG. 1.

The storage portion 11 having a substantially cylindrical shape is formed inside the main body 2. The opening section 12 is provided at one side of such storage portion 11 in the length direction, whereas the other side (bottom portion side) of the storage portion 11 in the length direction is closed. Further, the opening section 12 is provided at the curved surface portion 5M side of one of the curved portions 5; and formed on the outer side of the grip portion 4 in the length direction is a narrow and elongated opening section 13 that is communicated with the opening section 13, such elongated opening section 13 being formed on the outer edge 4S side (upper side). Moreover, as for the storage portion 11, an inner side surface 14 on the opening section 12 side is formed one step below, and this inner side surface 14 is located on the lower side of the storage portion 11 and is communicated with the opening section 12. Here, the storage portion 11 is substantially provided throughout the entire length of the grip portion 4.

An escape hammer 21 as a punch type hammer (referred to as hammer hereunder) is to be detachably stored in the storage portion 11. As for such hammer 21, a punch 23 made of a hard material is fixed to the tip end of a hammer grip portion 22 that is made of a synthetic resin and has a substantially cylindrical shape. Further, a curved surface portion 24 as a slanted surface is provided at the base end side of the hammer grip portion 22 as one side thereof in the length direction. When the hammer 21 is stored, this curved surface portion 24 is substantially flush and continuous with the curved surface portion 5M in a manner such that the curved surface portion 24 composes a part of the curved surface portion 5M. Moreover, an engagement portion 25 engageable with the elongated opening section 13 is provided at the tip end side of the curved surface portion 24. There, in a stored state, the opening section 12 is blocked by the curved surface portion 24, and the elongated opening section 13 is blocked by the engagement portion 25. Here, the engagement portion 25 is formed narrower than the tip end side of the hammer grip portion 22.

The base end side of the punch 23 is covered by a cover member 26 having a substantially cylindrical shape, and the tip end of the punch 23 protrudes from the tip end of the cover member 26. In such case, the cover member 26 may also be configured to be able to proceed and recede with respect to a tip end surface 22A of the hammer grip portion 22, with the aid of a biasing member not shown.

Further, an inclined guiding groove 31 having the shape of a cutout is formed on the base end side of the hammer grip portion 22. A blade body 32 as a cutting member is provided at a lower-side bottom portion of this guiding groove 31, and a cutting part 32A is hidden beneath the curved portion 5 positioned thereabove. The guiding groove 31 is formed in a way such that it is downwardly inclined from the tip end side of the hammer grip portion 22 toward the base end side thereof, and a groove opening section 31A of the guiding groove 31 is located on the tip end side of the hammer grip portion 22. Further, a tip end 25S of the engagement portion 25 is positioned above and away from the outer circumference of the hammer grip portion 22 in a circumferential direction. The cutting part 32A on the tip end of the blade body 32 is arranged along a central axis direction of the hammer 21.

A coil spring 33 as a biasing member is provided at the bottom section of the storage portion 11. This coil spring 33 is equipped with a push-out pin 34 as a push-out member for pushing the tip end surface 22A of the hammer grip portion 22. This push-out pin 34 is formed into a cylindrical shape; when the hammer 21 is stored, the coil spring 33 is compressed such that the cover member 26 is inserted into the push-out pin 34, and the tip end of the push-out pin 34 is pressed against the tip end surface 22A of the hammer grip portion 22.

Further, the assist grip handle 1 has a regulation portion 41 for restricting the movement of the hammer 21. This regulation portion 41 restricts the hammer 21 biased by the coil spring 33 from coming out of the storage portion 11.

Specifically, the regulation portion 41 includes a vertical groove portion 42 that is formed on the base end side of the storage portion 11, and is formed in a direction (vertical direction) intersecting with the storage portion 11. A locking pin 43 as a locking part is moveably provided in this vertical groove portion 42, and provided at the bottom portion side of the vertical groove portion 42 is a biasing member for biasing the locking pin 43 toward a direction along which the locking pin 43 will pop out. In this embodiment, as a biasing member, a coil spring 44 is arranged on the bottom portion side of the vertical groove portion 42.

Further, the locking pin 43 has a positioning protrusion 45 for determining a protrusion position of the locking pin 43 by engaging with the vertical groove portion 42. Here, provided on the inner circumference of the vertical groove portion 42 is a protrusion locking part 42A allowing the upper portion of the positioning protrusion 45 to be locked thereto.

In addition, the regulation portion 41 includes a push button 46 as an operation portion by which the movement of the locking pin 43 can be operated. A stepwise transverse groove portion 39 intersecting with the vertical groove portion 42 is formed on the curved portion 5, and the push button 46 is configured to be able to proceed and recede with respect to the transverse groove portion 39. Further, the push button 46 has a flange portion 46A as a disengagement prevention portion capable of abutting against a step part 39A of the transverse groove portion 39.

The push button 46 is engaged with the locking pin 43. By pushing the push button 46, the tip end of the locking pin 43 will recede into the vertical groove portion 42 against the bias of the coil spring 44. There, by releasing one's finger from the push button 46, the coil spring 44 will cause the tip end of the locking pin 43 to protrude into the storage portion 11.

In this case, by, for example, providing a slanted surface 49 at the tip end of the push button 46, and forming on the locking pin 43 a slanted surface 49A capable of sliding along the slanted surface 49, the locking pin 43 is allowed to recede through the operation of pushing the push button 46.

Further, a locking protrusion 47 is provided at the tip end of the locking pin 43, and a tip end surface 47A of this locking protrusion 47 is formed in a way such that it is downwardly inclined from the bottom portion side of the storage portion 11 toward the opening section 12 side thereof. In addition, provided at the hammer grip portion 22 is a locking concave portion 48 allowing the locking protrusion 47 to be locked thereto. The locking concave portion 48 is provided at the lower side as an opposite side to the upper side where the curved surface portion 24 is formed, a curved portion 48A corresponding to the tip end surface 47A protrudes next to the locking concave portion 48, and the curved portion 48A as the engagement portion is located on the bottom portion side of the storage portion 11 in the locking concave portion 48. Here, instead of the curved portion 48A, there may be provided a straight inclined portion.

In this way, once the hammer 21 has been inserted into the storage portion 11 from the opening section 12, the engagement portion 25 will engage with the elongated opening section 13 such that the circumferential direction of the hammer 21 to the storage portion 11 will be matched. By further inserting the hammer 21 therefrom, the tip end surface 22A of the hammer grip portion 22 will push the cover member 26 to compress the coil spring 44. When the coil spring 44 has been compressed by a given volume, the curved portion 48A will engage with the tip end surface 47A, and the locking pin 43 will recede as a result of being pushed. Next, an elastic restoring force of the coil spring 44 will cause the locking protrusion 47 of the locking pin 43 to be locked to the locking concave portion 48 of the hammer 21 so that the position of the hammer 21 can thus be fixed. Under such condition, the curved portion 5 is continuous with the curved surface portion 24.

Provided at the inner edge 5U of the other curved portion 5 is a hook 50 capable of freely rotating about an axis of the length direction of the grip portion 4. Due to a biasing member (not shown), the hook 50 is biased toward a storage position side along the inner edge 5U of the curved portion 5. By rotating the hook 50 against the bias of the biasing member, the hook 50 is then allowed to be positioned in a substantially horizontal use position inside a vehicle. Further, at such use position, a hanger (not shown) or the like can be hung on the hook 50.

FIG. 6A through FIG. 6C show an example of a method for attaching the assist grip handle 1. When additionally installing i.e. retrofitting the assist grip handle 1, the assist grip handle 1 is to be attached its follows. That is, a pattern paper 51 is to be pressed against the interior member 6, and such pattern paper 51 includes marks 52, 52 made up of opening sections or the like. A felt-tip marker 53 as a writing tool is then used to leave marks 54, 54 on the interior member 6 along these marks 52, 52. After removing such pattern paper, parts corresponding to these marks 54, 54 are bored to form attachment holes 55.

Next, the assist grip handle 1 is to be attached to the inner surface of the interior member 6 by having the aforementioned attachment portions 3, 3 fixed to the attachment holes 55, 55. Here, FIGS. 6A through 7B show the interior of an automobile as a vehicle, and the assist grip handle 1 is to be attached to an area of the vehicle side part that is above a window glass 7.

Figure 7A:
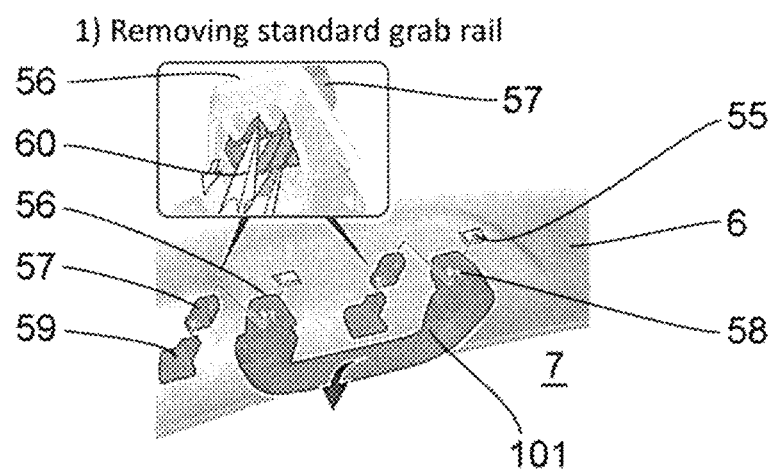
FIG. 7A is a perspective view showing a process of removing an existing assist grip handle in the first embodiment.
Figure 7B:
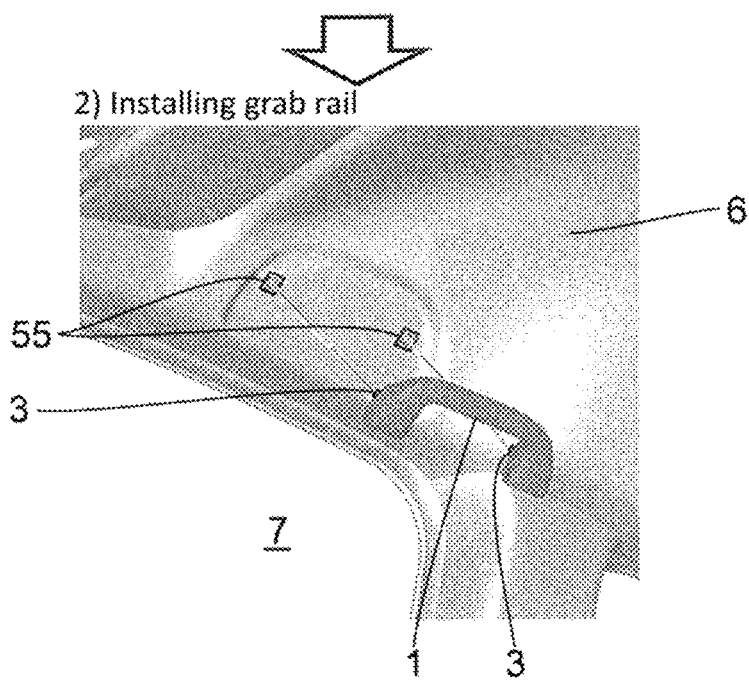
FIG. 7B is a perspective view showing a process of installing a new assist grip handle in the first embodiment.

FIG. 7A and FIG. 7B show an example where an existing assist zip handle 101 is, replaced by the assist grip handle 1 of the present invention. As shown this drawing, an attachment piece 56 is rotatably provided on one side surface of the curved portion 5 of the existing assist grip handle 101. Bored in such attachment piece 56 is an insertion hole 58 allowing a clip 57 to be inserted thereinto. The clip 57 is to be inserted into the attachment piece 56; and with the clip 57 being inserted into the attachment hole 55, a stopper 59 is to be pressurized into the clip 57, thereby enlarging the diameter of the clip 57, and thus allowing the assist grip handle 101 to be fixed to the interior member 6.

Further, the attachment piece 56 is biased toward a direction along the back surface of the curved portion 5, by means of a biasing member not shown. Here, the attachment piece 56, clip 57, insertion hole 58 and stopper 59 can be provided at the attachment portion 3 of the assist grip handle 1.

Next, the assist grip handle 101 can be removed by pulling the stopper 59 out of the existing assist grip handle 101, and then pulling out the clip 57 by a manual instrument 60 such as a pair of pliers. The assist grip handle 1 as a new replacement can then be attached to the inner surface of the interior member 6 by fixing the attachment portions 3, 3 thereof to the attachment holes 55, 55 from which the assist grip handle 101 has already been removed.

Described hereunder is a method for using the assist grip handle 1. When attempting to escape by breaking the window glass 7 of the vehicle, once the push button 46 of the assist grip handle 1 located above each passage in an oblique direction has been pushed, the base end side of the hammer 21 will partially pop out. In this way, the hammer 21 can be withdrawn therefrom by grabbing such base end side. In such case, since the blade body 32 is hidden in the curved portion 5 side, the curved portion 5 side can be grabbed. Further, since the locking pin 43 that has disengaged from the locking concave portion 48 will come into contact with the outer surface of the hammer grip portion 22, a resistance can thus be established, thereby preventing the hammer 21 from inadvertently popping out.

In this way, since the escape hammer 21 is incorporated into what is normally used as the assist grip handle 1, the hammer 21 will not be a hindrance on a normal occasion. Nevertheless, the escape hammer 21 can be immediately taken out and used at the time of use. Further, in the case of an automobile, there is no need to secure an extra storage location in the vehicle, and almost as many assist grip handles 1 as the number of the passengers can be provided, which is highly convenient.

Further, if a seat belt needs to be cut, one can grab the tip end side of the hammer grip portion 22, and then hook one side of the seat belt in a width direction into the guiding groove 31 so as to cut the seat belt with the blade body 32 located at the bottom portion.

In this way, in the present embodiment and in connection with claim 1, provided is the assist grip handle 1 installed inside an automobile as a vehicle. The assist grip handle 1 includes the grip portion 4 formed into the shape of an extending bar; the curved portion(s) 5 as the bent portion continuous with at least one end of the grip portion 4; and the attachment portion(s) 3 to be attached to the interior member 6 of the automobile. Provided inside the grip portion 4 is the storage portion 11 continuous with the opening section 12 formed on the curved portion 5 side, and the escape hammer 21 is stored in such storage portion 11. That is, the escape hammer 21 can be stored in the assist grip handle 1 in a compact manner.

In this way, in the present embodiment and in connection with claim 2, since there are provided the regulation portion 41 for restricting the movement of the escape hammer 21; and the push button 46 as the operation portion for releasing the restriction by the regulation portion 41, the hammer 21 can be easily installed in and removed from the assist grip handle 1.

In this way, in the present embodiment and in connection with claim 3, the curved surface portion 24 as the slanted surface portion is formed on at least one end side of the escape hammer 21, and the curved surface portion 24 composes a part of the curved portion 5 as the bent portion. That is, since a part of the hammer 21 composes a part of the assist grip handle 1, the hammer 21 is allowed to have a larger size.

In this way, in the present embodiment and in connection with claim 5, since the push button 46 as the operation portion is provided at the opening section 12 side of the assist grip handle 1, the push button 46 makes it easy for one to take out the hammer 21 while grabbing the assist grip handle 1.

In this way, in the present embodiment and in connection with claim 8, since the blade body 32 as the cutting member is provided in the inner side of the curved surface portion 24 as the slanted surface portion of the escape hammer 21, the blade body 32 can be held safely.

Further, the effects of the embodiment are as follows. The regulation portion 41 includes the locking pin 43 with the tip end thereof protruding into the storage portion 11; and the locking concave portion 48 that is provided at the hammer 21 and allows the locking pin 43 to be locked thereto. A projecting/retracting unit for projecting and retracting the locking pin 43 as the hammer 21 is inserted and removed, includes the coil spring 44, the tip end surface 47A, and the curved portion 48A as a pressing portion for pressing the tip end surface 47A. For these reasons, the position of the hammer 21 can be fixed through the regulation portion 41, simply by inserting the hammer 21 into the storage portion 11. In addition, since there is provided the coil spring 33 as the biasing member for biasing the escape hammer 21 toward the opening section 12 side, the hammer 21 can be easily installed in and removed from the assist grip handle 1.

Also, as a modified example, without providing on the assist grip handle 1 the push button 46 as the operation portion, the hammer 21 may be that capable of being taken out by pulling the curved surface portion 24 side as the base end side of the hammer 21. In such case, the regulation portion 41 may merely be a regulation portion capable of cancelling the locked state between the locking pin 43 and the locking concave portion 48 by pulling the curved surface portion 24 side. Further, without the regulation portion 41 as is the case in a third embodiment described later, and without the coil spring 33 as the biasing member shown in the present embodiment, the hammer 21 may also be that cable of being inserted into the storage portion 11 in a pressurized manner or the like so that the hammer 21 can be fixed and held under such stored state and then taken out at the time of use by pulling the curved surface portion 24 side. In such case, it is preferred that the opening section 12 be formed large, and the curved surface portion 24 side of the hammer 21 be formed large as well so as to match the opening section 12; or that the base end side of the hammer 21 be formed in a way such that it partially protrudes from the opening section 12 in the stored state so that the curved surface portion 24 side can be pulled easily.

Second Embodiment

Figure 8:
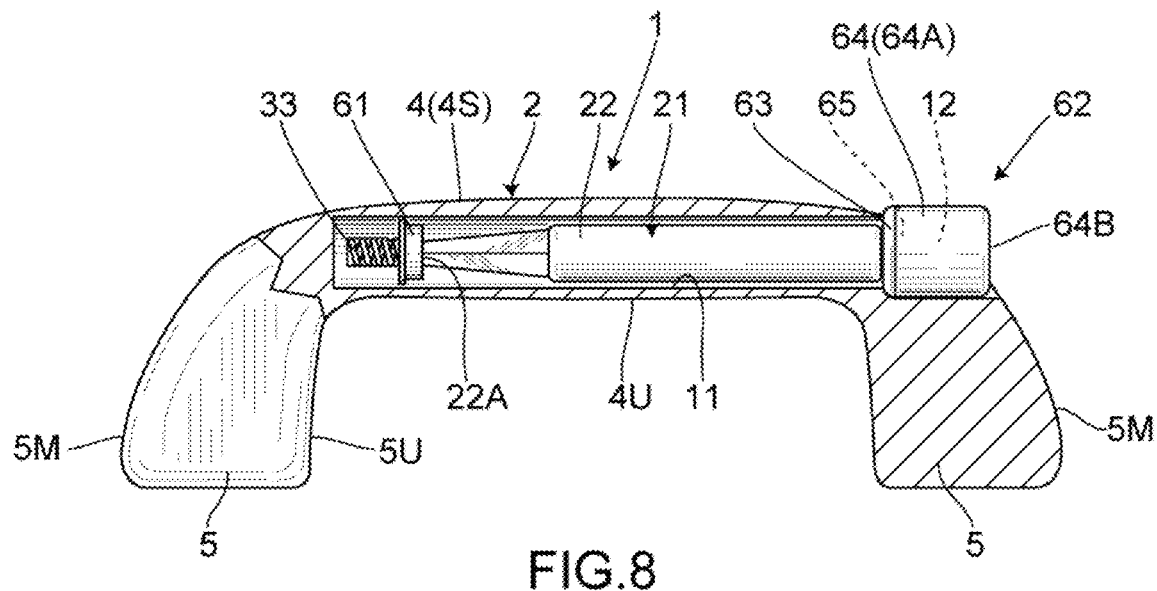
FIG. 8 is a cross-sectional view of a second embodiment of the present invention.
Figure 9:
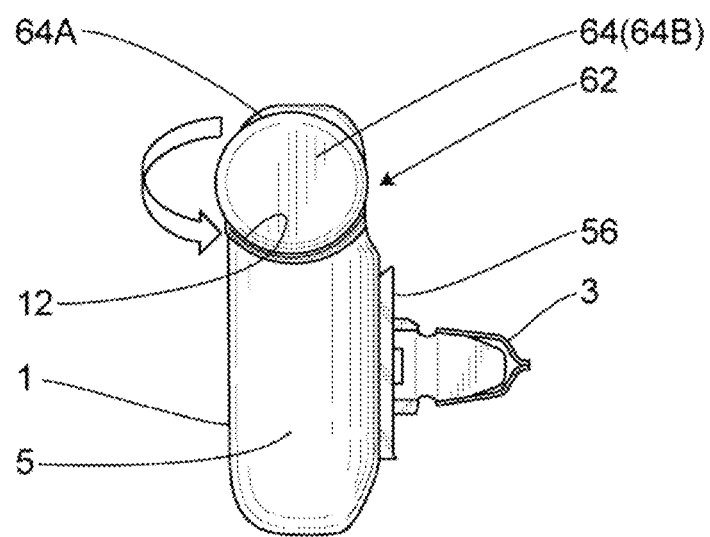
FIG. 9 is a side view of the second embodiment.
Figure 10:
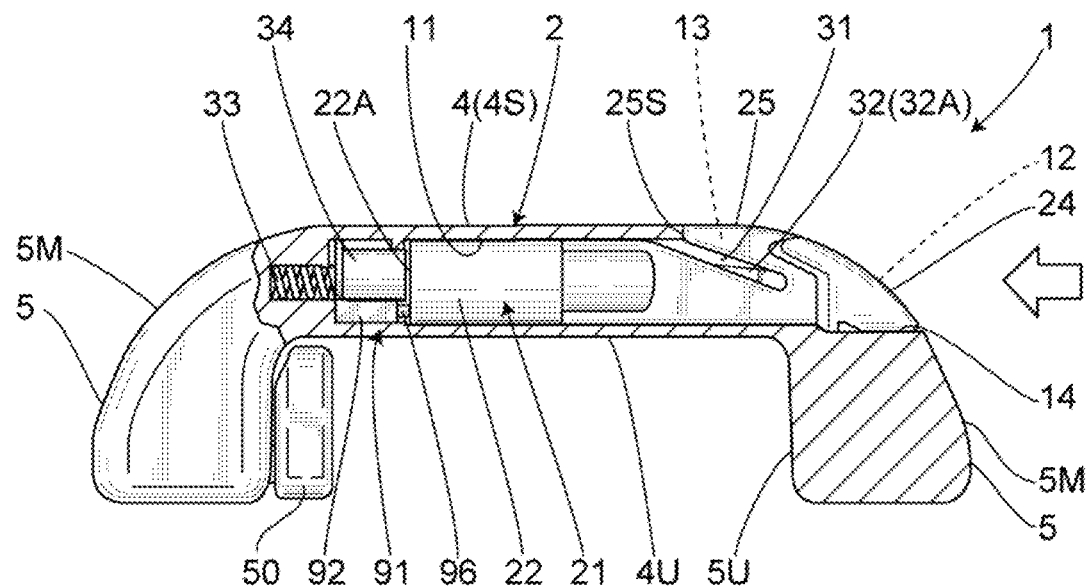
FIG. 10 is a cross-sectional view of a third embodiment of the present invention.
Figure 11:
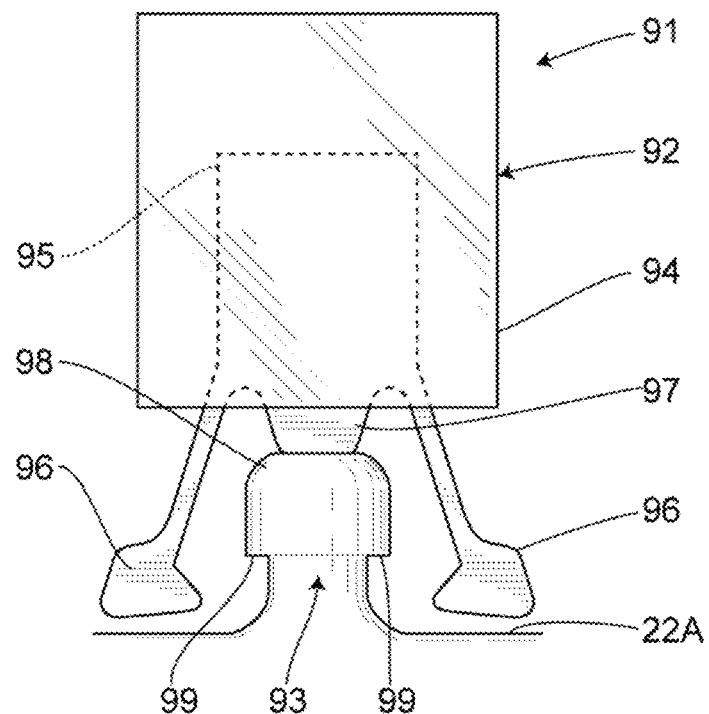
FIG. 11 is an explanatory diagram showing a regulation portion of the third embodiment.
Figure 12:
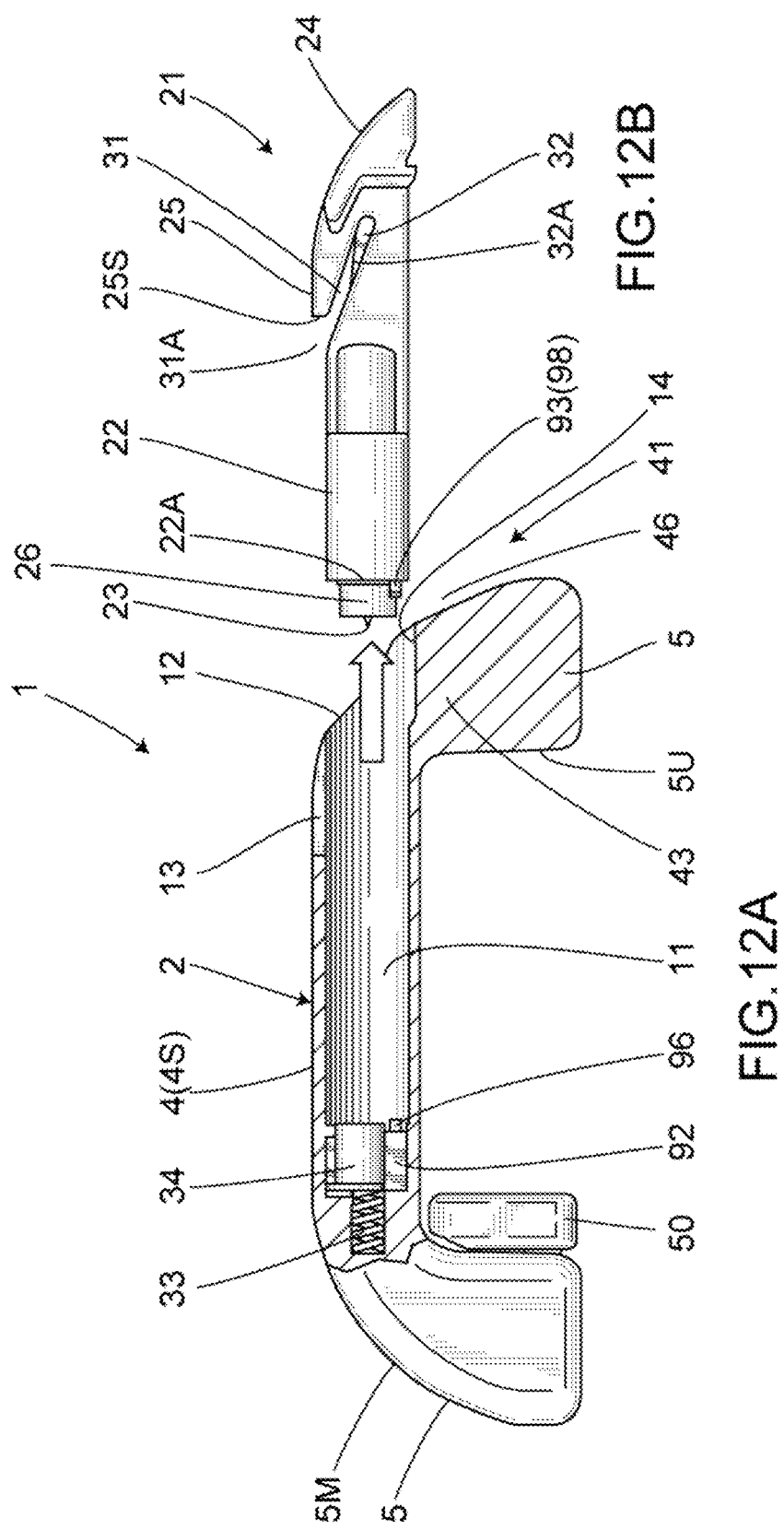
FIG. 12A is a cross-sectional view of a in body of an assist grip handle in the third embodiment.
FIG. 12B is a front view of the escape hammer in the third embodiment.

FIGS. 8 and 9 show a second embodiment of the present invention. Parts identical to those in the first embodiment are given identical symbols, and the detailed descriptions thereof are thus omitted. The escape hammer 21 in this embodiment is that of a type allowing the punch 23 to protrude when an operation portion not shown has been pushed or manipulated in other ways. Further, a pressing body 61 is provided at the coil spring 33 as the biasing member, and this pressing body 61 is capable of pushing the tip end surface 22A of the hammer grip portion 22.

Further, there is provided a regulation operation portion 62 serving as both the regulation portion and the operation portion. This regulation operation portion 62 is composed of a ring body 63 fixed to the opening section 12 side; and a cap-shaped blocking member 64 that is detachably provided at the ring body 63 and serves to block the opening section 12. This blocking member 64 includes a ring part 64A to be fitted onto the ring body 63; and a blocking part 64B blocking the base end side of the ring part 64A.

The blocking member 64 is detachably provided at the ring body 63 through an attachment/detachment structure 65. The attachment/detachment structure 65 may be that of a rotary type such as a screw structure and a bayonet coupling structure; or that of a push-type in which the blocking member 64 is able to be coupled to the ring body 63 when pushed toward the length direction of the grip portion 4, and then by pushing the blocking member 64 in such coupled state, the coupling will thus be cancelled so as to allow the blocking member 64 to be removed.

Further, by providing a reflective material and/or a phosphorescent material on the outer surface of the hammer grip portion 22 of the hammer 21, roles as marks can be served.

Therefore, by operating the regulation operation portion 62 to remove the blocking member 64 so as to open the opening section 12, the bias of the coil spring 33 will cause a part of the hammer 21 to pop out of the storage portion 11 through the ring body 63, which then allows one to use such hammer 21 to break the window glass 7 and escape therefrom.

Further, in this embodiment, due to the regulation operation portion 62 serving both as a regulation portion and as an operation portion, the hammer 21 can be easily taken out.

Third Embodiment

FIGS. 10 through 12B show a third embodiment of the present invention. Parts identical to those in the above embodiments are given identical symbols, and the detailed descriptions thereof are thus omitted. In this embodiment, a regulation portion is provided at the bottom portion side of the storage portion 11 that is located on the opposite side of the opening section 12; and an operation portion is provided at the opening section 12 side.

The regulation portion in this embodiment is a push latch 91. This push latch 91 includes a locking main body 92 fixed to the bottom portion of the storage portion 11; and a locking storage portion 93 that is engageable with the locking main body 92 and is provided at the tip end side of the hammer grip portion 22. As a result of inserting the hammer 21 into the storage portion 11, once the locking storage portion 93 at the tip end has pushed the locking main body 92, the locking main body 92 will be locked to the locking storage portion 93 so as to restrict and fix the hammer 21. In contrast, by pushing the base end side of the hammer 21 by a given volume from the fixed state, the locking of the locking main body 92 will be cancelled such that the bias of the coil spring 33 will then cause the base end side of the hammer 21 to protrude out of the opening section 12.

For example, the locking main body 92 may include a casing 94 that is attached to the bottom portion of the storage portion 11 and is open at the opening section 12 side thereof; a slide member 95 that is provided in the casing 94 along a length direction of the storage portion 11 and is capable of freely moving back and forth; supporting arms 96, 96 as a pair of supporting parts that are provided at the tip end of the slide member 95 and are capable of being freely opened and closed; and a pressing portion 97 that is provided at the slide member 95 in between these supporting arms 96, 96 and is to be pushed by the locking storage portion 93. In addition, a mechanism capable of the aforementioned actions, a biasing member and the like (not shown) may be built inside the casing 94 or the like.

Further, the locking storage portion 93 has a hook member 98. In the locked state, the supporting arms 96, 96 are closed to be locked to hook portions 99, 99 of the hook member 98. This locked state constitutes the fixed state of the push latch 91. By pushing the curved surface portion 24 as an operation portion from this state, the hook member 98 will push the slide member 95. After the slide member 95 has receded, the biasing member will cause the slide member 95 to move forward so that the supporting arms 96, 96 will open to cancel the locked state.

Further, in this embodiment, the regulation portion is a push latch 91, and the operation portion is the curved surface portion 24 that is exposed even in the stored state. In this way, since the regulation portion can be provided at the opposite side of the opening section 12, and since the push latch 91 is used, pushing the curved surface portion 24 allows the hammer 21 to be easily fixed and taken out.

Further, as a modified example, the regulation portion and operation portion of the first or second embodiment may be provided on the assist grip handle 1 of the third embodiment. For example, in the third embodiment, if there are provided, for example, the regulation portion 41 of the first embodiment and the push button 46 of the first embodiment as the operation portion, although the operation of pushing the push button 46 and the curve surface portion 24 is required when taking out the hammer 21, the hammer 21 can be doubly regulated.

In this way, by employing multiple regulation portions and operation portions, the hammer 21 can be regulated doubly.

Fourth Embodiment

Figure 13:
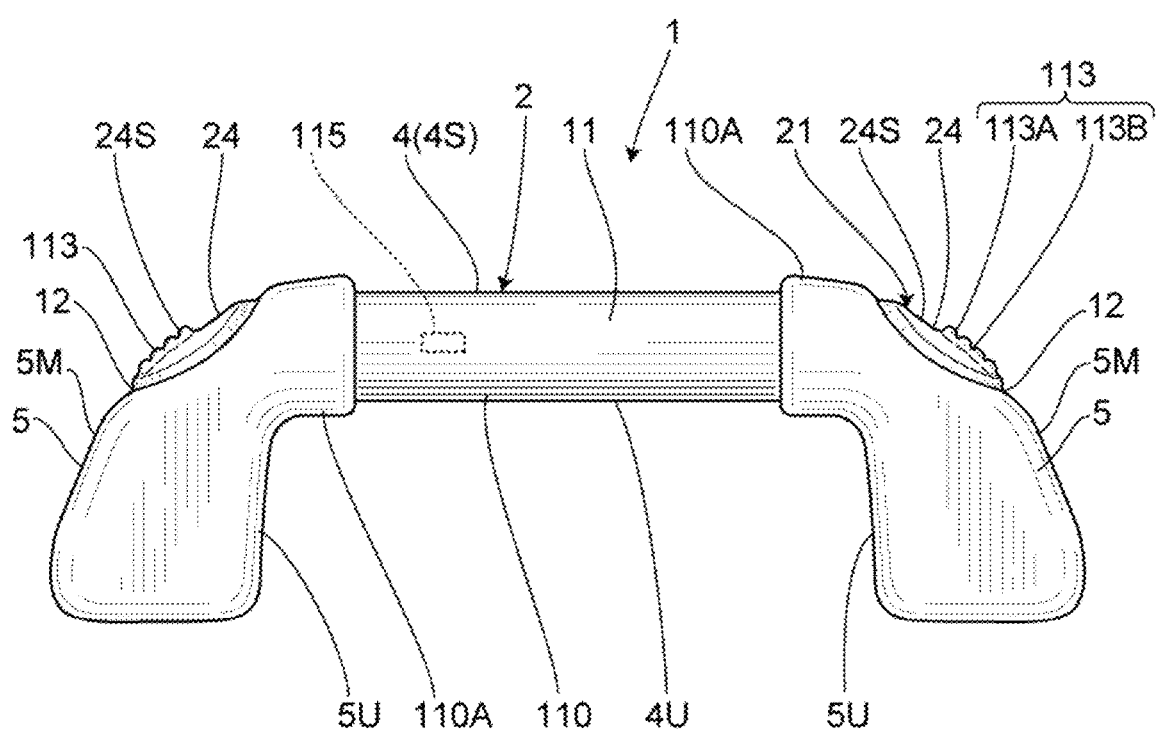
FIG. 13 is a front view of a fourth embodiment of the present invention.
Figure 14:
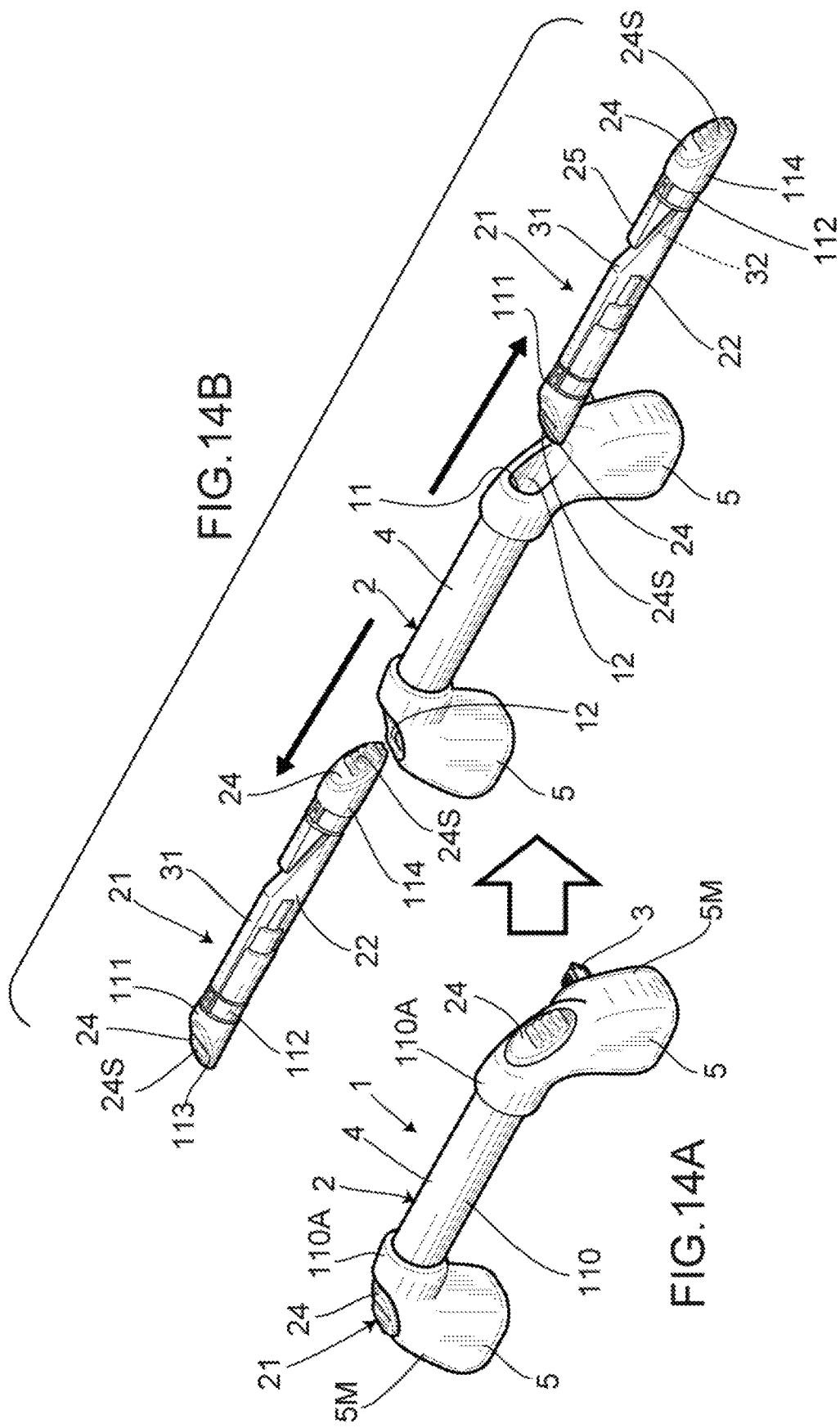
FIG. 14A is a perspective view of an assist grip handle in the fourth embodiment.
FIG. 14B is a perspective view showing that a hammer is capable of being taken out from both sides of the assist grip handle in the fourth embodiment.
Figure 15:
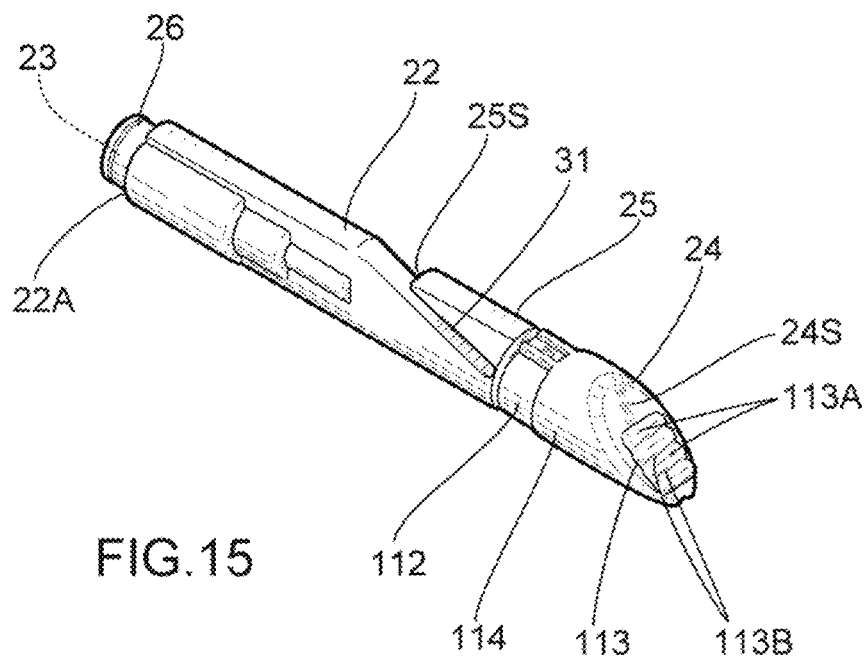
FIG. 15 is a perspective view showing a state where a tip end member has been removed from the escape hammer of the fourth embodiment.

FIGS. 13 to 15 show a fourth embodiment of the present invention. Parts identical to those in the above embodiments are given identical symbols, and the detailed descriptions thereof are thus omitted. In this embodiment, the opening sections 12, 12 are provided at the curved portions 5, 5 on both sides of the main body 2; and the escape hammer 21 is installed in a way such that the hammer 21 can be taken out from each of the opening sections 12, 12 on both sides.

The grip portion 4 has a tube-shaped grip central portion 110; and grip cylindrical portions 110A, 110A on both sides. The grip cylindrical portions 110A are integrally provided at the curved portions 5. The curved portions 5, 5 are connected to both sides of the grip central portion 110, and the end portions of the grip central portion 110 are inserted into the grip cylindrical portions 110A and fixed therein. Further, the storage portion 11 is continuously formed inside the curved portion 5, the grip central portion 110 and the other curved portion 5. Provided at both sides of this storage portion 11 are the opening sections 12, 12 serving as open sections of the curved portions 5, 5 on both sides. Here, in this embodiment, the elongated opening section 13 is not provided. Further, the storage portion 11, throughout the entire length thereof, is formed into a cylindrical shape substantially identical to the shape of the inner circumference of the grip central portion 110. Particularly, the grip portion 4 is composed of the grip central portion 110; and the grip cylindrical portions 110A, 110A each having a diameter larger than that of the grip central portion 110.

As for the hammer 21 in this embodiment, a tip end member 111 serving as a cap is detachably provided at the tip end of the hammer grip portion 22. This tip end member 111 integrally includes a cylindrical portion 112 that is to be detachably fitted onto and fixed to the cover member 26; and the curved surface portion 24 blocking the tip end side of such cylindrical portion 112. Further, by fitting the cylindrical portion 112 onto the cover member 26, the tip end member 111 will be fixed to the hammer grip portion 22, and the punch 23 will be covered by such tip end member 111.

Moreover, a concave-convex portion 113 as an antislip portion is provided on the curved surface portion 24. This concave-convex portion 113 includes multiple ridges 113A and concave grooves 113B that are each formed in a direction intersecting with a length direction of the hammer 21, but are arranged along such length direction as a whole. Further, the curved surface portion 24 having the concave-convex portion 113 composes an operation portion 24S.

A base end member 114 having the same structure as the tip end member 111 is fixed to the base end side of the hammer grip portion 22. In addition, when the hammer 21 is stored in the storage portion 11, the curved surface portions 24, 24 on both sides serve to block the opening sections 12, 12 on both sides, and these curved surface portions 24, 24 are formed in a manner such that they are substantially continuous with the outer edges 4S of the grip cylindrical portions 110A of the grip portion 4.

Provided on the inner circumference of the storage portion 11 are elastic pressing portions 115, 115 as regulation portions for restricting the movement of the hammer 21. These elastic pressing portions 115, 115 are arranged across the hammer 21 from each other; as a result of having the elastic pressing portions 115, 115 press against the outer circumference of the hammer grip portion 22, the hammer 21 will be restricted and fixed in the storage portion 11. Further, by pushing any one of the curved surface portions 24, 24, the hammer 21 can be pushed and taken out from the opening section 12 on the other side. Instead, one may also put his/her finger(s) on the ridges 113A so as to pull out the hammer 21. In this way, the hammer 21 can be inserted into and taken out from the storage portion 11.

Thus, by taking the hammer 21 out of the assist grip handle 1, and then removing the tip end member 111 from such hammer 21, the punch 23 can be used to break the window glass 7. After use, the tip end member 111 is to be attached to the tip end of the hammer grip portion 22, followed by inserting the hammer 21 into the storage portion 11 so as to again fix the hammer 21 stored in the assist grip handle 1.

Further, in the present embodiment and in connection with claim 3, at least one end side of the escape hammer 21 is equipped with the curved surface portion 24 as the slanted surface portion; in this embodiment, the curved surface portions 24, 24 are provided at both ends. Here, since the curved surface portion 24 composes a part of the curve portion 5 as the bent portion, a part of the hammer 21 composes a part of the assist grip handle 1, thereby allowing the hammer 21 to be formed into a large size.

Furthermore, in the present embodiment and in connection with claim 4, the curved portions 5, 5 as the bent portions are formed on both sides of the grip portion 4; the opening sections 12, 12 are individually formed on both of these curved portions 5, 5; the curved surface portions 24, 24 as the slanted surface portions are formed at both ends of the escape hammer 21; and the escape hammer 21 can be taken out from any one of the opening sections 12, 12. That is, an excellent convenience can be achieved as the escape hammer 21 can be taken out from any one of the opening sections 12, 12 on both sides.

Furthermore, in the present embodiment and in connection with claim 7, since the operation portion 24S is provided on the escape hammer 21, the escape hammer 21 can be taken out by operating such operation portion 24S of the escape hammer 21.

The effects of the embodiment are as follows. That is, as for the operation portion 24S, the concave-convex portion 113 is provided on the curved surface portion 24 located at the opening section 12, in the stored state. Thus, the structure is simple; and by pushing or pulling the operation portion 24S, the hammer 21 can be easily taken out.

Fifth Embodiment

Figure 16:
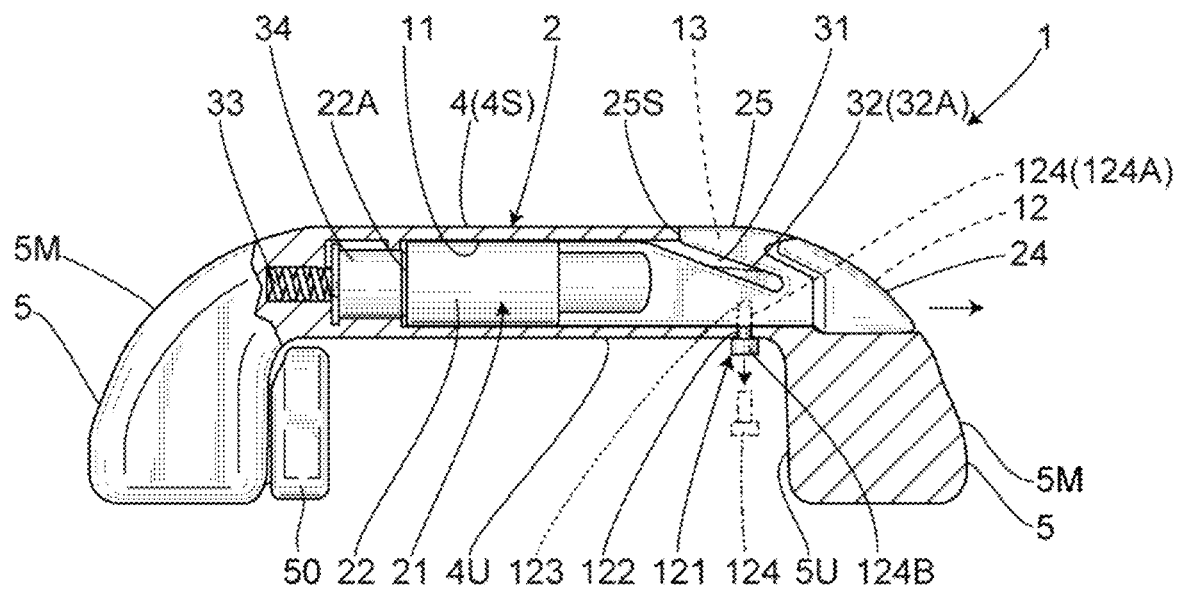
FIG. 16 is a cross-sectional view of a fifth embodiment of the present invention.

FIG. 16 shows a fifth embodiment of the present invention. Parts identical to those in the above embodiments are given identical symbols, and the detailed descriptions thereof are thus omitted. In this embodiment, there is shown a modified example of the regulation portion. For example, being on the basis of the assist grip handle 1 of the first embodiment, and yet the regulation portion 41 is not provided in the present embodiment; instead, there is provided a regulation operation portion 121 serving both as a regulation portion and as an operation portion.

The regulation operation portion 121 is configured as follows. That is, a through hole 122 is bored in the inner edge 4U side of the hammer grip portion 22; an attachment hole 123 communicated with such through hole 122 is provided on the hammer grip portion 22; and there is provided a regulation pin 124 that is to be inserted through the through hole 122, and is capable of being detachably fixed to the attachment hole 123.

The regulation pin 124 is to be fixed by, for example, pressing a pin main body 124A thereof into the attachment hole 123. And then, by pulling a large-diameter head portion 124B of the regulation pin 124 with a given force or a force stronger than such force, the regulation pin 124 can be removed from the assist grip handle 1.

As a result of removing the regulation pin 124 in this manner, the bias of the coil spring 33 will cause the base end side of the hammer 21 to partially pop out from the opening section 12, and the hammer 21 can thus be taken out by holding such base end side.

Further, in the present embodiment and in connection with claim 6, since the regulation operation portion 121 as the operation portion is provided at the grip portion 4, the escape hammer 21 can be taken out by operating the regulation operation portion 121 of the grip portion 4.

Furthermore, the effects of the present embodiment are as follows. That is, the regulation operation portion 121 includes the regulation pin 124 for temporarily fixing the hammer 21 when, for example, inserted into the hammer 21; and the coil spring 33 as a biasing member biasing the escape hammer 21 toward the opening section 12 side. Thus, the structure is simple, and the operation is easy as well since the hammer 21 is allowed to partially come out of the storage portion 11 by performing the operation of pulling the regulation pin 124.

Sixth Embodiment

Figure 17:
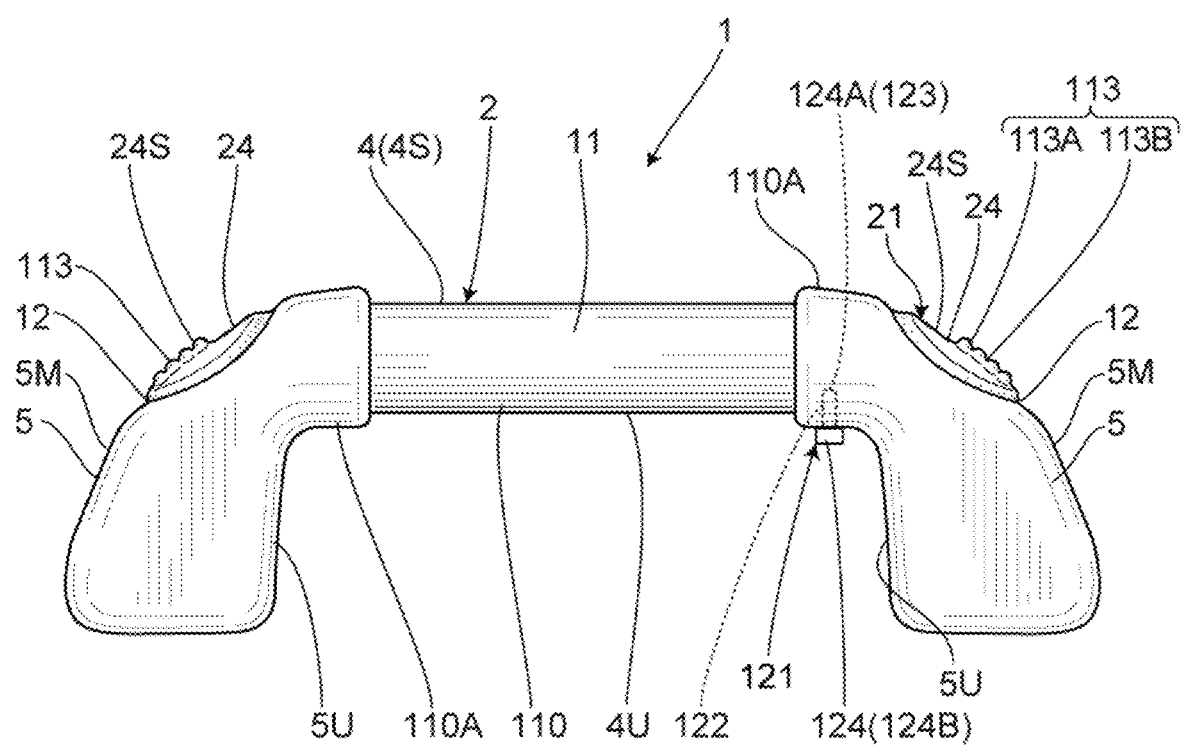
FIG. 17 is a front view of a sixth embodiment of the present invention.

FIG. 17 shows a sixth embodiment of the present invention. Parts identical to those in the above embodiments are given identical symbols, and the detailed descriptions thereof are thus omitted. In this embodiment, there is shown a modified example of the regulation portion. For example, being on the basis of the assist grip handle 1 of the fourth embodiment, and yet the elastic pressing portion 115 as the regulation portion is not provided in the present embodiment; instead, there is provided the abovementioned regulation operation portion 121.

Particularly, the through hole 122 is bored in the inner edge of the grip cylindrical portion 110A composing a part of the grip portion 4.

Further, in this embodiment, since the coil spring 33 is not employed, even after the regulation pin 124 has been removed, the hammer 21 will not partially come out of the storage portion 11 unless otherwise operated. That is, after removing the regulation pin 124, the hammer 21 can be situationally either pushed out or pulled out from any one of the opening sections 12, 12 on both sides.

In addition, since the regulation pin 124 is provided at the grip cylindrical portion 110A that has a diameter larger than that of the grip central portion 110 and is located on the outer side, the grip central portion 110 can be grabbed easily. Further, since the regulation pin 124 is provided at the inner edge 4U of the grip cylindrical portion 110A, the regulation pin 124 will not constitute a hindrance.

Seventh Embodiment

Figure 18:
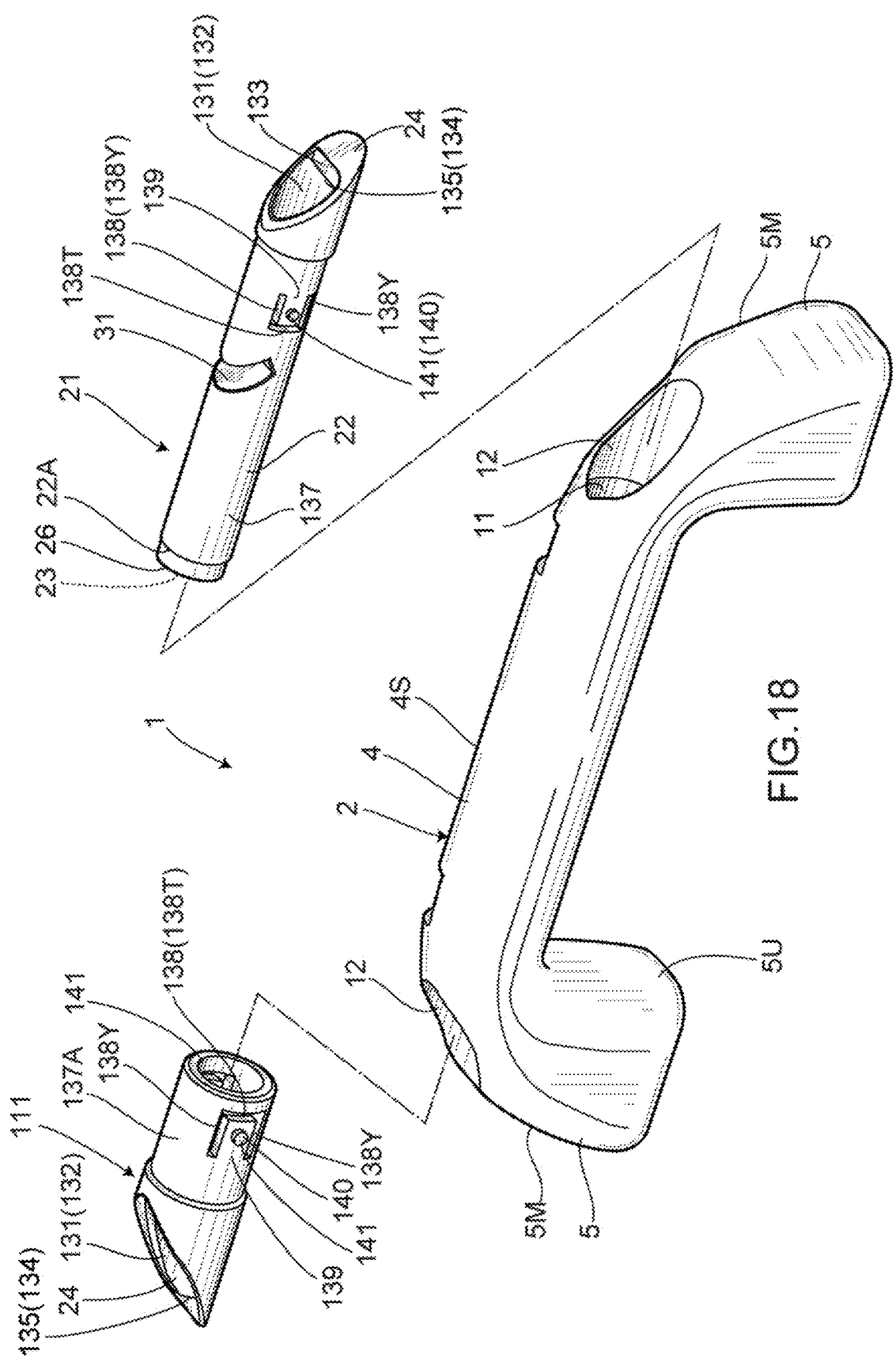
FIG. 18 is a perspective view of a seventh embodiment of the present invention.
Figure 19:
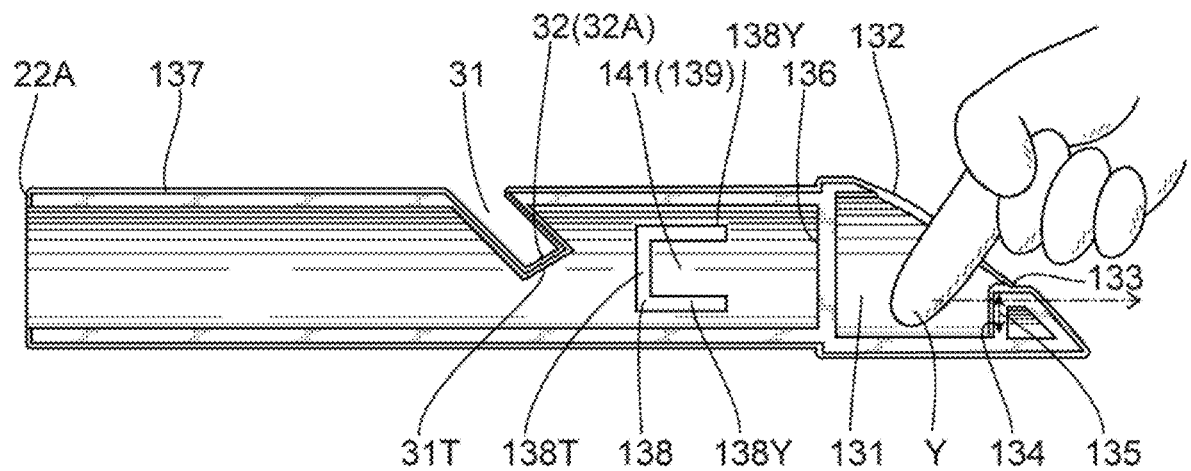
FIG. 19 is a cross-sectional view of an escape hammer of the seventh embodiment.
Figure 20:
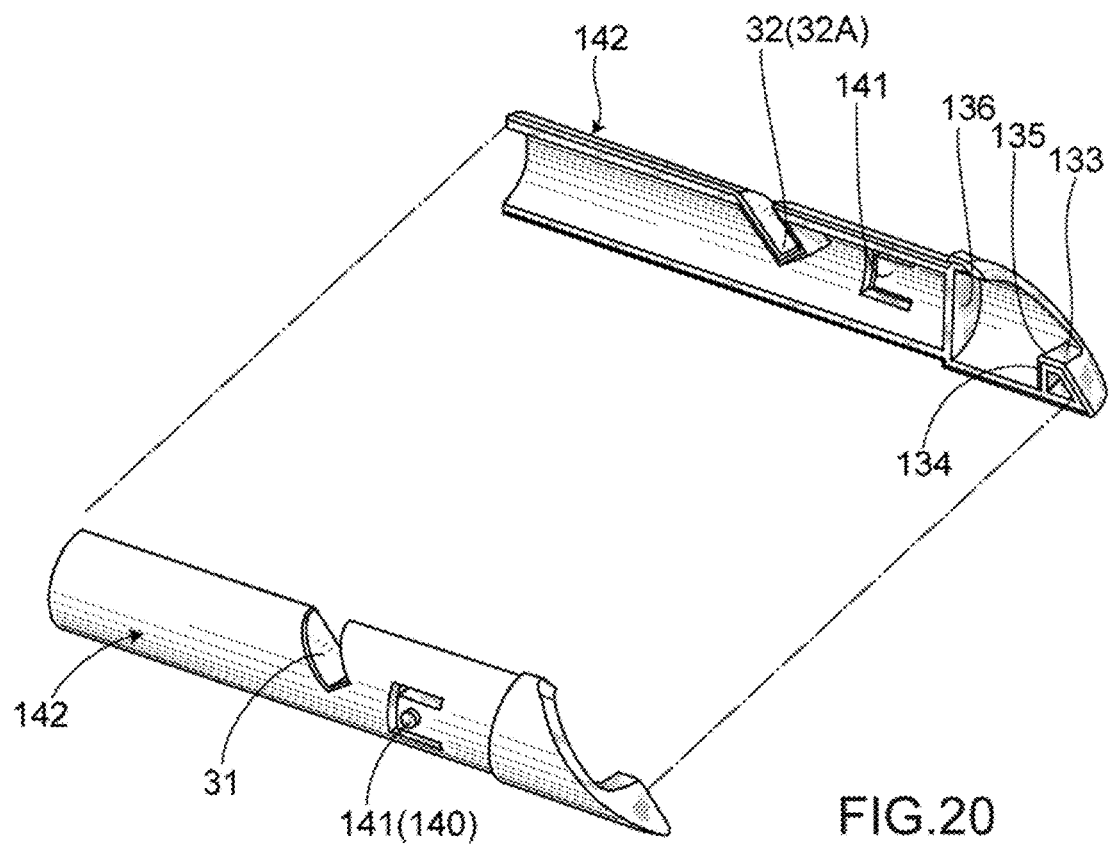
FIG. 20 is a perspective view of division bodies of the escape hammer of the seventh embodiment.

FIGS. 18 to 20 show a seventh embodiment of the present invention. Parts identical to those in the above embodiments are given identical symbols, and the detailed descriptions thereof are thus omitted. In this embodiment, there is shown a modified example of the hammer 21. As for the hammer 21 of this example, the tip end member 111 as the cap is detachably provided at the tip end of the hammer grip portion 22.

An operation concave portion 131 as an operation portion is provided on each of the curved surface portion 24 provided at the base end side of the hammer trip portion 22; and the curve surface portion 24 provided at the tip end side of the tip end member 111. With regard to such operation concave portion 131, an insertion opening section 132 is provided on the upper side of the curved surface portion 24; provided at the lower edge of the insertion opening section 132 are an upper surface portion 133 and a finger hooking portion 135 having a vertical surface portion 134; provided in the inner region of the finger hooking portion 135 is a space allowing a finger Y to be inserted thereinto; and the finger hooking portion 135 is thus a hooking portion for operation. Here, as one example of the insertion opening section 132, the vertical dimension thereof is about 15 mm, and the width dimension thereof is about 13 mm. Further, in this embodiment, the finger hooking portion 135 serves as an operation portion.

As shown in FIG. 18 and FIG. 19, a bottom surface portion 136 is provided at the hammer 21's tip end side in the operation concave portion 131; and at such bottom surface portion 136 of the hammer grip portion 22, a cylindrical tubular portion 137 is integrally provided at the tip end side of the hammer 21. Further, as compared to the first embodiment, an angle of the guiding groove 31 to the central axis of the hammer grip portion 22 is larger; the angle of the guiding groove 31 to the central axis is about 45 degrees. Further, the cutting part 32A of the blade body 32 is provided in the vicinity of a lower bottom portion 31T of the guiding groove 31, and is arranged parallel to such lower bottom portion 31T of the guiding groove 31. Here, the lower bottom portion 31T is slanted in a direction opposite to that of the guiding groove 31 with respect to the central axis of the hammer 21.

A cutout groove 138 having the shape of a toppled "U" is formed on the left and right parts of the tubular portion 137 in a way such that the tubular portion 137 is thus penetrated thereby. A vertical groove 138T is provided at the tip end side of such cutout groove 138; transverse grooves 138Y, 138Y are provided at the upper and lower ends of the base end of the vertical groove 138T; and provided inside the cutout groove 138 is an elastic piece 139 whose tip end side is formed into a free end. Further, a protrusion 140 is provided on the outer surface of the elastic piece 139. This protrusion 140 presses against the inner circumference of the storage portion 11 such that these elastic piece 139 and protrusion 140 compose a regulation portion 141. Here, three sides of the elastic piece 139 which are the tip end, upper and lower sides thereof are surrounded by the cutout groove 138, and only the base end side of the elastic piece 139 is joined to the tubular portion 137, thereby allowing such elastic piece 139 to undergo elastic deformation.

The bottom surface portion 136 is provided at the hammer 21's base end side in the operation concave portion 131 of the tip end member 111. At the bottom surface portion 136 of the tip end member 111, a tubular portion 137A shorter than the tubular portion 137 is integrally provided at the base end side of the hammer 21. The regulation portions 141, 141 are provided on the left and right parts of this tubular portion 137A, and the tip end of the elastic piece 139 of the regulation portion 141 is located in the central region of the hammer 21.

As shown in FIG. 20, the hammer grip portion 22 may be formed by combining two division bodies 142, 142 that are apart from each other in the left and right directions. As shown in FIG. 18, the punch 32 is provided at the tip end of the division bodies 142, 142 that have been combined together. Further, the tip end member 111 as a cap is detachably provided at the tip end of the hammer grip portion 22.

With the hammer 21 being stored in the storage portion 11, the protrusion 140 presses against the inner circumference of the storage portion 11 so that the hammer 21 is restricted from moving. By hooking the finger Y or the like on the finger hooking portion 135 under such condition, and then pulling the same outward, the hammer 21 can be taken out from the opening section 12. In this case, it is convenient, because the hammer 21 can be taken out from both of the opening sections 12, 12 on both sides. Further, by pushing one of the curved surface portions 24, the hammer 21 can be taken out from the opening section 12 on the other end.

In this way, the present embodiment brings about similar functions and effects as those of the above embodiments.

Thus, in the present embodiment and in connection with claim 7, since the finger hooking portion 135 as the operation portion is provided on the escape hammer 21, the escape hammer 21 can be taken out by operating the finger hooking portion 135 of the escape hammer 21.

Further, effects of the present embodiment are such that since the finger hooking portion 135 has the vertical surface portion 134, the hammer 21 can be easily taken out by hooking one's finger on such vertical surface portion 134.

First Reference Example

Figure 21:
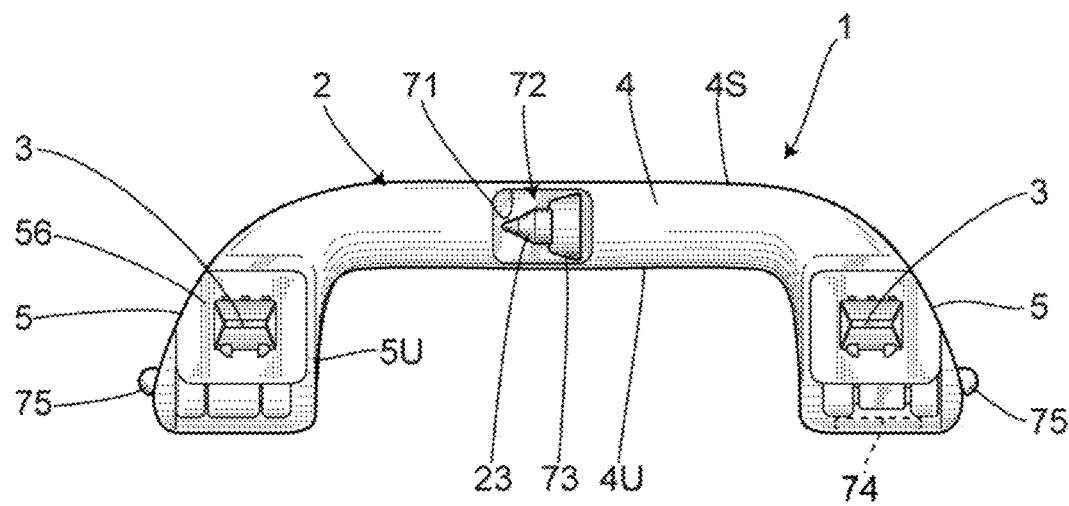
FIG. 21 is a rear view of a first reference example of the present invention.
Figure 22:
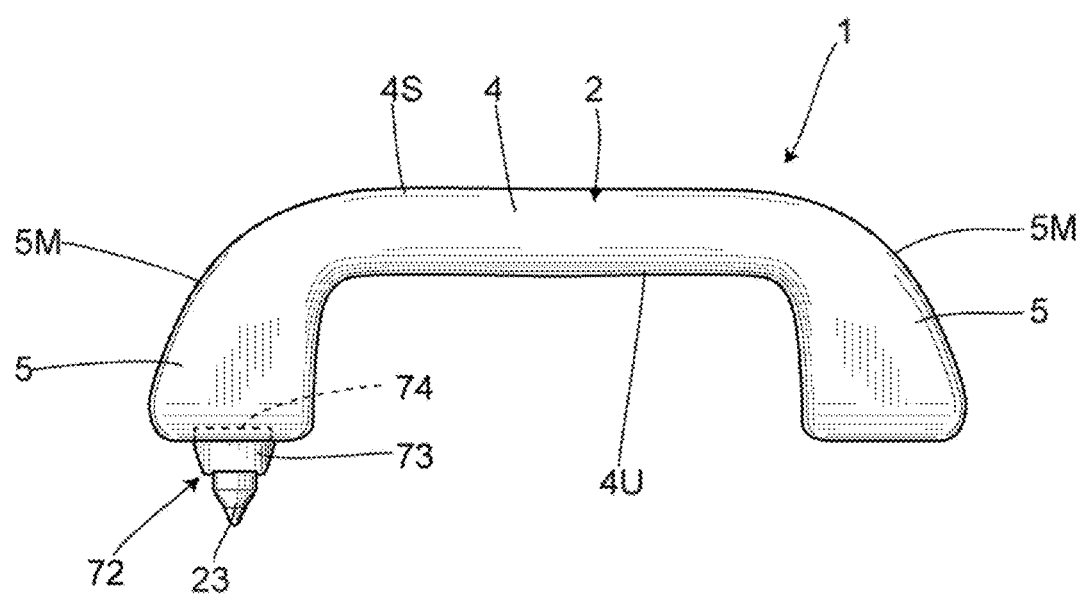
FIG. 22 is a front view of a usage state of the first reference example.

FIG. 21 and FIG. 22 show a reference example 1 of the present invention. Parts identical to those in the above embodiments are given identical symbols, and the detailed descriptions thereof are thus omitted. As for the assist grip handle 1 of this embodiment, a storage concave portion 71 is provided in the central region of the back surface side of the grip portion 4, and a punch body 72 is detachably stored in such storage concave portion 71. The punch body 72 integrally includes the punch 23 and an attachment body 73. Further, provided at the tip end edge of one of the curved portions 5 is an attachment storage portion 74 allowing the attachment body 73 to be detachably attached thereto. Here, in the stored state, the attachment body 73 is temporarily fixed in the storage concave portion 71.

An attachment/detachment structure of the attachment body 73 to the attachment storage portion 74 may be that of a rotary type such as a screw structure or a bayonet coupling structure; a press-fitting type; or an adsorption type employing a magnet, a suction cup or the like. Further, an openable/closable and/or attachable/detachable lid body (not shown) may also be provided at the opening section of the storage concave portion 71.

Further, push buttons 75 as attachment/detachment operation portions are provided at the tip end sides of the curved surface portions 5M of the curved portions 5, 5. By pulling the assist grip handle 1 with such push buttons 75 being pushed, the attachment portions 3, 3 can be removed from the assist grip handle 1.

Thus, after removing the assist grip handle 1, and then fixing the punch body 72 to the tip end edge of the curved portion 5, one can hold the grip portion 4 of the assist grip handle 1 to break the window glass 7.

The effects of this reference example are as follows. That is, the storage concave portion 71 as a storage portion is provided on the main body 2 of the assist grip handle 1; the punch 23 is detachably stored in such storage concave portion 71; and the punch 23 can be attached to the main body 2 at the time of use. Thus, the assist grip handle 1 can be used as the escape hammer. Further, the assist grip handle 1 is attached to the interior space of an automobile as a vehicle. The assist grip handle 1 includes the grip portion 4 formed into the shape of an extending bar; the curved portion(s) 5 as the bent portion continuous with at least one end of the grip portion 4; and the attachment portion(s) 3 that is continuous with the curved portion 5 and is to be attached to the interior member 6 of the vehicle. Provided at the grip portion 4 is the storage concave portion 71 as the storage portion for storing the punch 23, and provided at the outer side of the assist grip handle 1 is the attachment storage portion 74 allowing the punch 23 to be attached thereto. For these reasons, the punch 23 can be stored inside the assist grip handle 1 in a compact manner, and can be attached to the assist grip handle 1 at the time of escape so that the assist grip handle 1 can be used as the escape hammer.

Second Reference Example

Figure 23A:
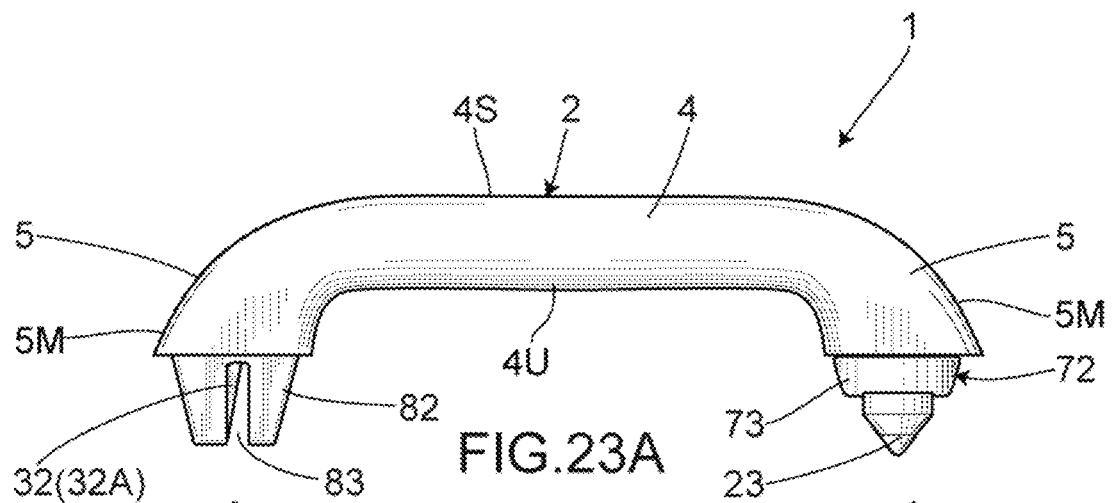
FIG. 23A is a front view showing a state where a tip end portion(s) has been removed from an assist grip handle in a second reference example.
Figure 23B:
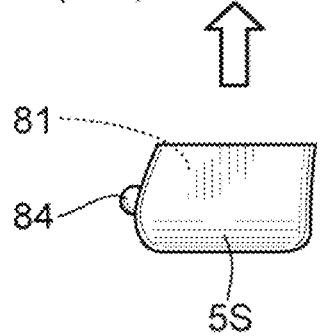
FIG. 23B is a front view of one of the tip end portions in the second reference example.
Figure 23C:
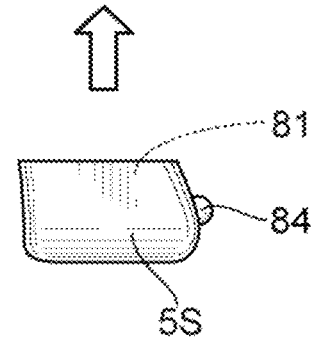
FIG. 23C is a front view of the other tip end Portion in the second reference example.

FIG. 23A through FIG. 23C show another reference example of the present invention. Parts identical to those in the above embodiments are given identical symbols, and the detailed descriptions thereof are thus omitted. As for the assist grip handle 1 of this embodiment, a tip end portion 5S of the curved portion 5 can be attached to and detached therefrom; a storage space 81 is provided inside the tip end portion 5S; and the attachment portion 3 is provided at the tip end portion 5S.

At one of the curved portions 5, a cutting member attachment portion 82 is provided at where the tip end portion 5S is to be separated. A vertical opening groove 83 is provided at such cutting member attachment portion 82, the abovementioned blade body 32 is attached inside such opening groove 83, and the cutting part 32A thereof is slanted with respect to a length direction of the opening groove 83.

At the other curved portion 5, the punch body 72 is provided at where the tip end portion 5S is to be separated. Here, the cutting member attachment portion 82 and the punch body 72 are stored in the storage spaces 81, 81.

Further, a push button 84 as an attachment/detachment operation portion is provided at the tip end portion 5S. By pulling the grip portion 4 with such push button 84 being pushed, the tip end portions 5S, 5S can be disengaged from the assist grip handle 1. Here, the tip end portions 5S, 5S can be installed again after use.

Thus, the assist grip handle 1 can be removed with the tip end portions 5S, 5S being left, and one can then hold the grip portion 4 of the assist grip handle 1 to, for example, break the window glass 7 and cut the seat belt.

Further, the effects of this reference example are as follows. That is, the storage spaces 81 are provided in the main body 2 of the assist grip handle 1, and the punch 23 is to be stored in such storage space 81. By removing the tip end portion 5S at the time of use, the assist grip handle 1 can be used as an escape hammer. In addition, the tip end portion 5S serves as a cover for the punch 23 and the blade body 32, which allows the punch 23 and the blade body 32 to be hidden in the curved portion 5.

However, the present invention is not limited to the abovementioned embodiments; various modified embodiments are possible within the scope of the gist of the invention. For example, the regulation portion is not limited to those disclosed in the above embodiments. There can be used various types of regulation portions. Further, the operation portion may, for example, be provided at the grip portion, or at the curved portion on the side opposite to the opening section. Furthermore, other than the coil spring, various kinds of springs or the like may be used as the biasing member. Furthermore, the push latch is not limited to that disclosed in the above embodiments. There may be used various types of push latches, as long as the push latch employed is that capable of establishing and maintaining a locked state when pushed, and then releasing such locked state when pushed again. Furthermore, in a case where the push latch is equipped with a biasing member biasing the pressing portion forward, the biasing member of the push latch may thus serve as a biasing member biasing the escape hammer toward the opening section side. In such case, the coil spring as the biasing member described in the first embodiment can even be omitted. Furthermore, the regulation portion and operation portion in one embodiment may be applied to the rest of the embodiments e.g. the regulation portions and operation portions in the fourth and seventh embodiments may be exchanged with one another. Furthermore, other than a synthetic resin, the assist grip handle may be made of various types of materials.

DESCRIPTION OF THE SYMBOLS

1 Assist grip handle
3 Attachment portion
4 Grip portion
5 Curved portion (bent portion)
6 Interior member
11 Storage portion
12 Opening section
21 Escape hammer
23 Punch
24 Curved surface portion (slanted surface portion/operation portion)
24S Operation portion
33 Coil spring (biasing member)
41 Regulation portion
42 Vertical groove portion
46 Push button (operation portion)
62 Regulation operation portion (regulation portion/operation portion)
91 Push latch (regulation portion)
115 Elastic pressing portion (regulation portion)
121 Regulation operation portion (regulation portion/operation portion)
135 Finger hooking portion (operation concave portion/operation portion)
141 Regulation portion

The invention claimed is:

1. An assist grip handle attached to an interior space of a vehicle, comprising:
    a grip portion extending in the shape of a bar;
    a bent portion continuous with at least one end of the grip portion; and
    an attachment portion that is continuous with the bent portion and is attached to an interior member of the vehicle, wherein
    a storage portion is provided inside the grip portion, the storage portion being continuous with an opening section formed at the bent portion side; and an escape hammer is stored in the storage portion.

2. The assist grip handle according to claim 1 further comprising:
    a regulation portion for restricting a movement of the escape hammer; and
    an operation portion for releasing the restriction by the regulation portion.

3. The assist grip handle according to claim 1, wherein the escape hammer has a slanted surface portion formed on at least one end side of the escape hammer, and the slanted surface portion composes a part of the bent portion.

4. The assist grip handle according to claim 1, wherein the bent portion is formed at both sides of the grip portion, the opening section is individually formed at the bent portions on both sides, a slanted surface portion is formed at both ends of the escape hammer, and the escape hammer is capable of being taken out from any one of the opening sections.

5. The assist grip handle according to claim 2, wherein the operation portion is provided at the opening section side.

6. The assist grip handle according to claim 2, wherein the operation portion is provided at the grip portion.

7. The assist grip handle according to claim 2, wherein the operation portion is provided at the escape hammer.

8. The assist grip handle according to claim 3, wherein a cutting member is provided inside the slanted surface portion of the escape hammer.

* * * * *